United States Patent [19]

Escher et al.

[11] Patent Number: 5,702,639
[45] Date of Patent: *Dec. 30, 1997

[54] USE OF COMPLEX LIGANDS FOR IONS IN FERROELECTRIC LIQUID-CRYSTAL MIXTURES

[75] Inventors: Claus Escher, Mühltal, Germany; Takamasa Harada, Saitama, Japan; Gerhard Illian; Norbert Rösch, both of Frankfurt am Main, Germany; Rainer Wingen, Hattersheim am Main, Germany

[73] Assignee: Hoechst Aktiengesellschaft, Frankfurt, Germany

[*] Notice: The term of this patent shall not extend beyond the expiration date of Pat. No. 5,178,792.

[21] Appl. No.: 455,668

[22] Filed: May 31, 1995

Related U.S. Application Data

[63] Continuation of Ser. No. 310,926, Sep. 22, 1994, abandoned, which is a continuation of Ser. No. 852,253, filed as PCT/EP90/02018, Sep. 22, 1997, abandoned.

[30] Foreign Application Priority Data

Dec. 1, 1989 [DE] Germany .............. 39 39 697.5
Apr. 12, 1990 [DE] Germany .............. 40 11 803.7

[51] Int. Cl.⁶ .......................... C09K 19/52; C09K 19/58; C09K 19/34; G02F 1/13
[52] U.S. Cl. .................. 252/299; 252/299.2; 252/299.3; 252/299.4; 252/299.61; 359/103
[58] Field of Search .................. 252/299.01, 299.2, 252/299.3, 299.5, 299.4, 299.61; 359/103

[56] References Cited

U.S. PATENT DOCUMENTS

| | | | |
|---|---|---|---|
| 3,814,700 | 6/1974 | Aviram et al. | 252/408 |
| 4,077,900 | 3/1978 | Pohl et al. | 252/299.01 |
| 5,178,792 | 1/1993 | Harada et al. | 252/299.6 |
| 5,206,751 | 4/1993 | Escher et al. | 252/299.01 |
| 5,250,215 | 10/1993 | Magerstadt et al. | 252/299.5 |
| 5,333,075 | 7/1994 | Harada et al. | 252/299.01 |

FOREIGN PATENT DOCUMENTS

| | | |
|---|---|---|
| 0385688 | 9/1990 | European Pat. Off. |
| 0387561 | 9/1990 | European Pat. Off. |
| 2637430 | 2/1978 | Germany |
| 2338281 | 3/1985 | Germany |

*Primary Examiner*—Shean C. Wu
*Attorney, Agent, or Firm*—Curtis, Morris & Safford, P.C.

[57] ABSTRACT

A ferroelectric liquid crystal mixture containing two or more components, at least one of which is a complex ligand for ions, in particular for cations, is particularly suitable for use in ferroelectric liquid crystal displays.

20 Claims, 5 Drawing Sheets

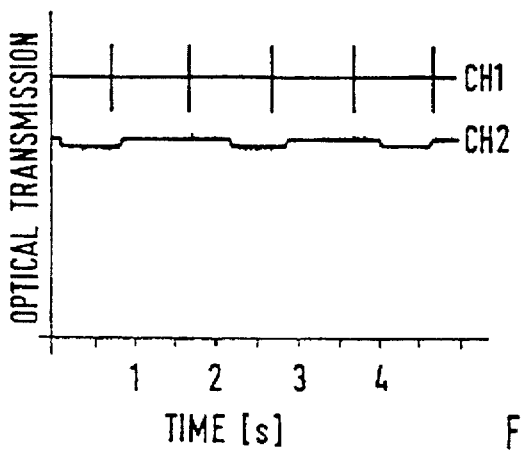
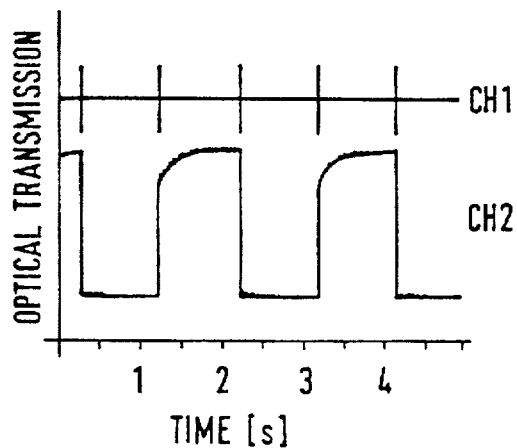
Fig. 1a
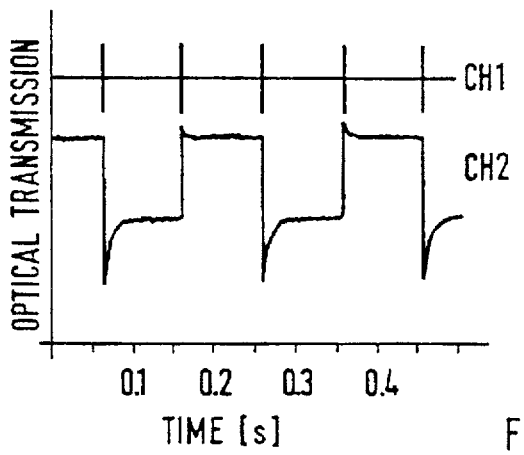
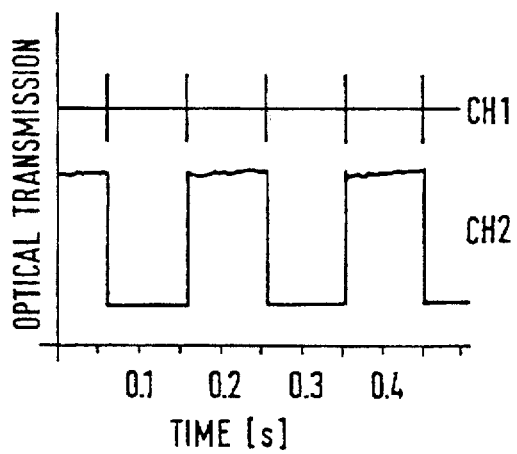
Fig. 1b
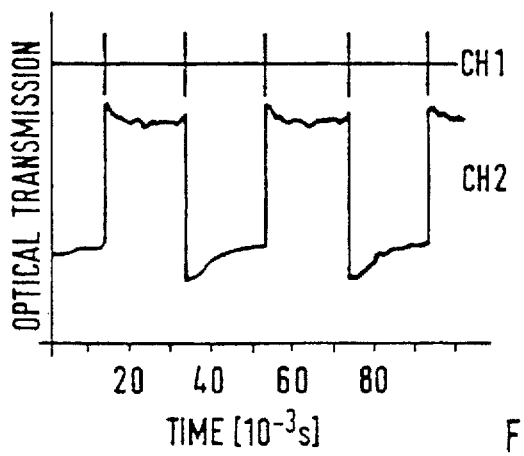
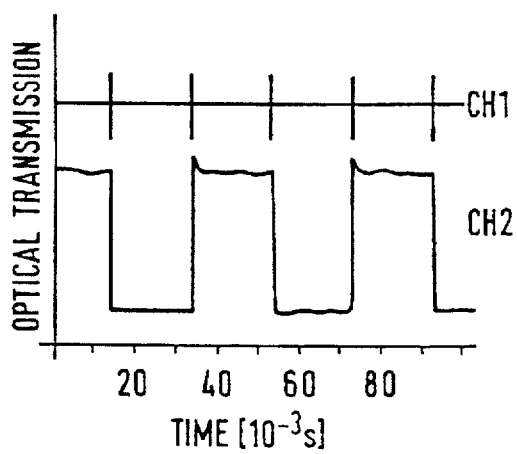
Fig. 1c
Fig. 1

DARK STATE
WITHOUT COMPLEX-LIGAND 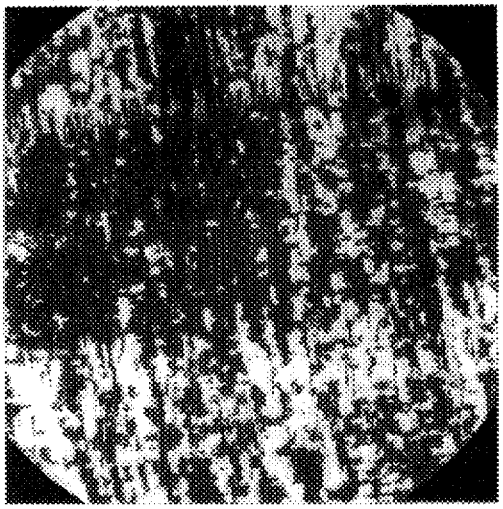 WITH COMPLEX-LIGAND 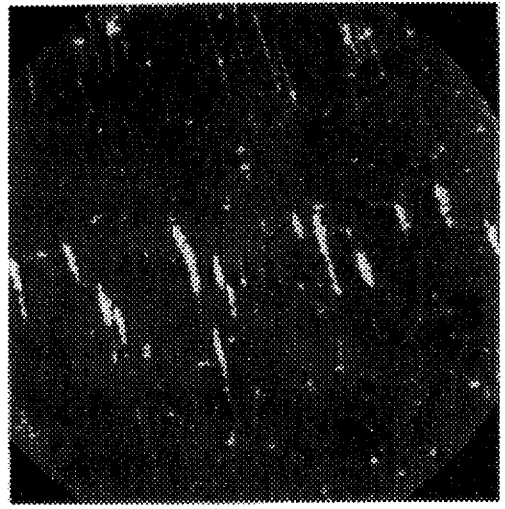
Fig. 2a
BRIGHT STATE
WITHOUT COMPLEX-LIGAND 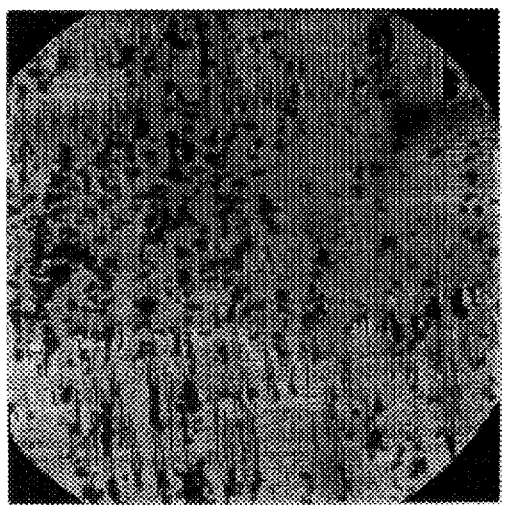 WITH COMPLEX-LIGAND 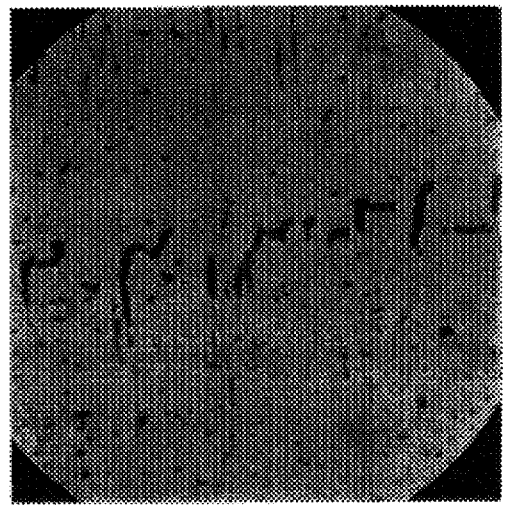
Fig. 2b
Fig. 2

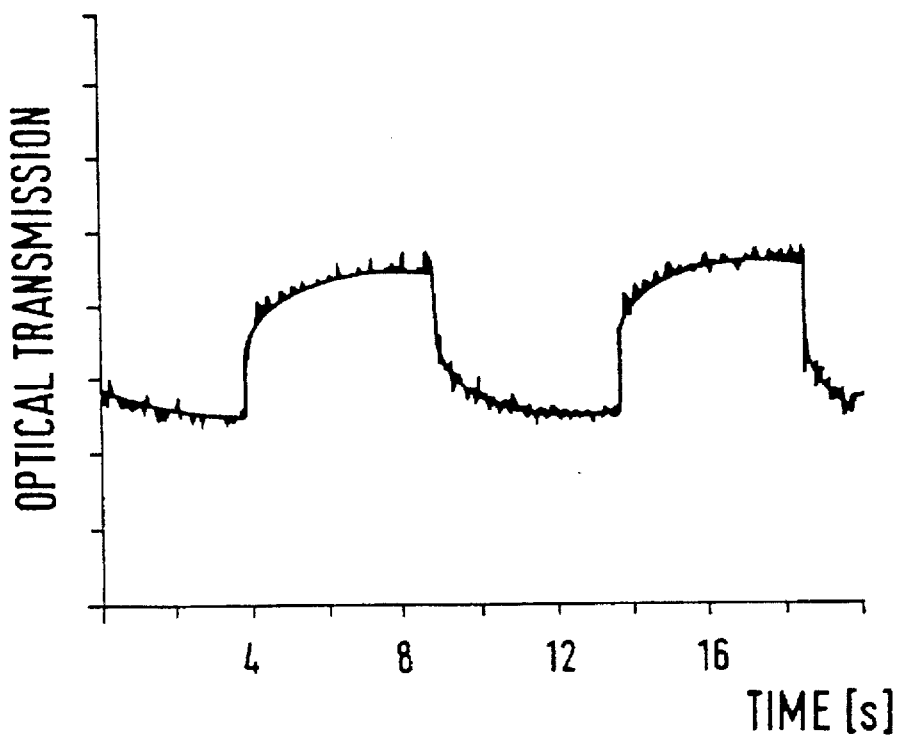
Fig. 3a
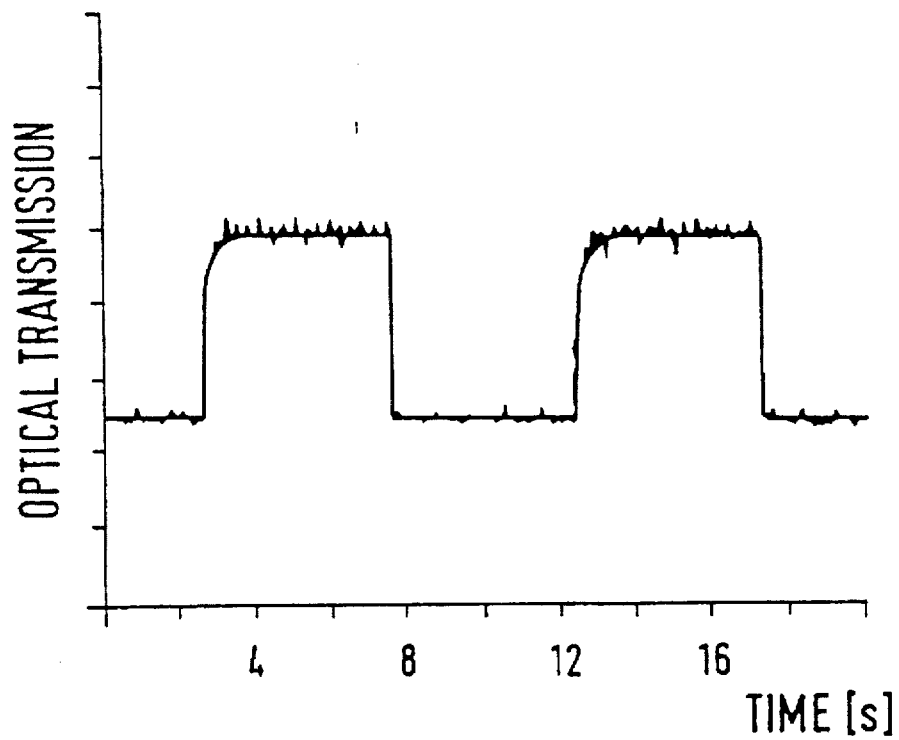
Fig. 3b
Fig. 3

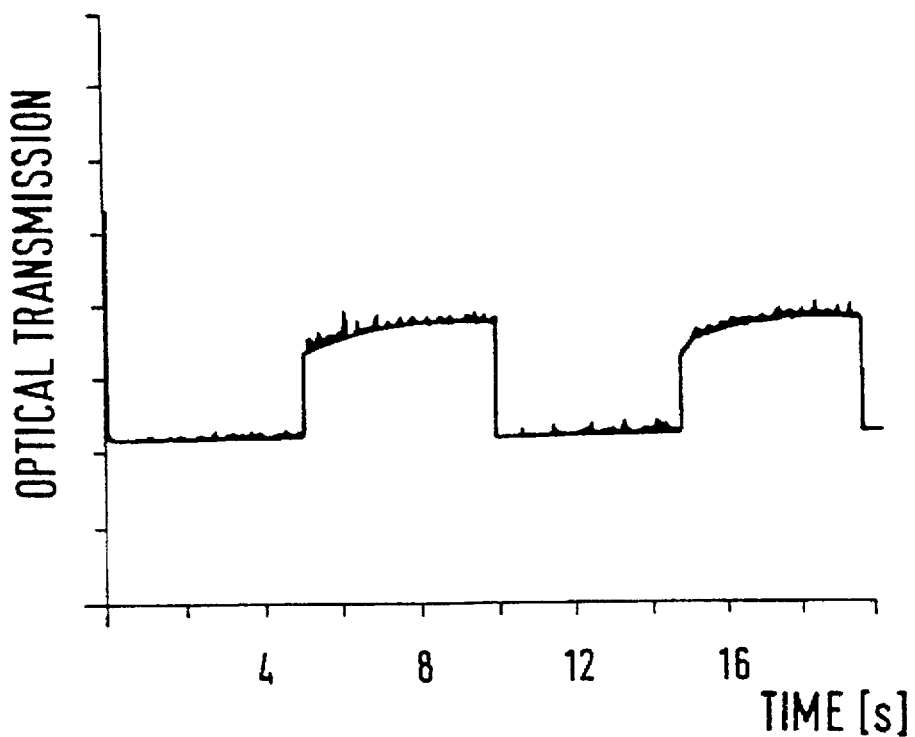
Fig. 4a
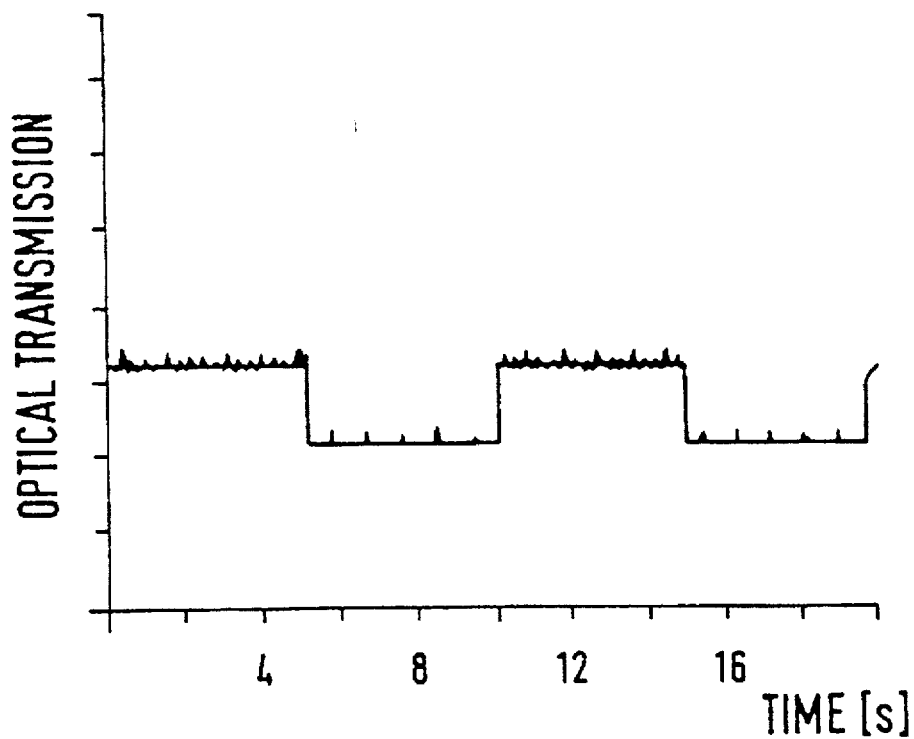
Fig. 4b
Fig. 4

USE OF COMPLEX LIGANDS FOR IONS IN FERROELECTRIC LIQUID-CRYSTAL MIXTURES

This application is a continuation of application Ser. No. 08/310,926, filed Sep. 22, 1994, now abandoned, which is a continuation of Ser. No. 07/852,253, filed as PCT/EP90/02018, Sep. 22, 1997, now abandoned.

Switching and display elements containing ferroelectric liquid-crystal mixtures ("FLC light valves") are known, for example from EP-B 0 032 362. Liquid-crystal light valves are devices which, for example as a consequence of electrical actuation, modify their optical transmission properties in such a manner that incident light which may be reflected again is modulated in intensity. Examples are conventional watch and calculator displays or liquid-crystal displays in the office automation and television sectors. However, these also include light shutters as are employed in photocopiers, printers, welding goggles, polarized spectacles for 3D viewing, etc. Spatial light modulators are also applications for liquid-crystalline light valves (see Liquid Crystal Device Handbook, Nikkan Kogyo Shimbun, Tokyo, 1989; ISBN 4-526-02590-9G 3054 and the papers cited therein).

Electrooptical switching and display elements generally contain at least one alignment layer, electrodes, outer plates (for example made of glass), and one polarizer if they are operated in guest-host or reflective mode or two polarizers if transmissive birefringence mode is used. The switching and display elements may, if desired, contain further auxiliary layers, such as, for example, diffusion barrier or insulation layers.

The alignment layers, which comprise an organic (for example polyimide, polyamide or polyvinyl alcohol) or inorganic (for example SiO) material, together with a spacing between the outer plates which is chosen to be sufficiently small, bring the FLC molecules into a configuration in which their longitudinal axes are parallel to one another and in which the smectic planes are perpendicular or inclined to the alignment layer. In this arrangement, the molecules, as is known, have two equivalent orientations between which they can be switched by applying a pulsed electrical field, i.e. FLC displays are capable of bistable switching. The switching times are inversely proportional to the spontaneous polarization of the FLC mixture and are in the range of microseconds.

The principal advantage of such FLC displays over the LC displays which are still the ones predominantly encountered hitherto in industry is regarded as being the multiplex ratio which can be achieved, i.e. the maximum number of lines which can be addressed in time-sequential mode ("multiplex mode"), which, in contrast to LC displays is virtually unlimited in the case of FLC displays. This electrical addressing is essentially based on the pulse addressing mentioned above and described in illustrative terms in SID 85 Digest p. 131 (1985).

However, during further development of FLC displays in recent years, a disadvantage has become apparent in that said pulse addressing frequently only results in reproducible switching between the two stable states in the case of sufficiently low values for the spontaneous polarization. For example, it can be observed that an FLC display which has been in one of the two stable states for a relatively long time ("stationary image") can be switched into the other state only with great difficulty, i.e. only with a high amplitude, very long pulse duration of the applied voltage or after repeated application of the pulses. This optical hysteresis behavior results, in picture displays, in an image which has been inscribed over a relatively long period being visible in the subsequent image as a shadowy ghost image. This observation of optical hysteresis is more pronounced the higher the spontaneous polarization of the FLC mixture, and depends, in addition, on the nature and thickness of the alignment layer.

This effect is apparent and interfering even at only low spontaneous polarization. At particularly high values ($P_s>35$ $nC·cm^{-2}$), switching is generally no longer possible at all via pulse addressing. Since, as is known, very short switching times can only be achieved through high polarization, this prevents, in particular, the use of very rapid FLC mixtures. One of the hypotheses on the cause of the phenomenon of optical hysteresis is that ionic impurities in the FLC mixture are responsible (cf. for example B. J. Dijon et al., SID conference, San Diego 1988, pages 2–249). The solutions known hitherto of a) direct contact between the FLC mixture and the electrodes and b) complex cleaning have not yet resulted in complete success; the first method is very complex due to the necessity for involving specific measures to avoid electrical shortcircuits, and the second requires a specific type of cleaning for each component of a mixture and complex and expensive handling of the FLC mixture. A further solution has been proposed by M. Nitta et al. (Japanese Journal of Applied Physics 27 (1988) 1447), in which charge-transfer complexes (CTCs) are employed to improve the optical switching behavior.

A further serious disadvantage of FLC displays is, in addition, that they have, in the non-addressed state, (usually) undesired non-uniformity of the director (i.e. the preferential direction of the molecule) and one or more so-called twist states (see M. A. Handschy, N. A. Clark, S. T. Lagerwall; Phys. Rev. Lett. Vol. 51, 471 (1983): M. Glogarova, J. Pavel; J. Phys. (France) Vol. 45, 143 (1984): N. Higi, T. Ouchi, H. Takezoe, A. Fukuda; Jap. J. Appl. Phys. Vol. 27, 8 (1988)). In the memory state and in multiplexed mode this non-uniformity results in a considerable reduction in contrast in the display, in particular because the opaque state becomes considerably less dark (gray dark state). The contrast is the ratio between the transmissions in the bright and dark switching states. The appearance of twist states is, in addition, frequently associated with wavelength dispersion, which can result in false colors in the display. Currently, maximum contrast values of from 5 to 10 are given for FLC displays. An exception is displays in which the alignment layer used is SiO vapor-deposited at an angle and which have higher values for the contrast, but are rarely encountered due to the considerable costs for applying the SiO layer.

It has already been attempted to suppress the appearance of interfering twist states through a suitable choice of alignment layers, but hitherto only with unsatisfactory results. The virtually uniform states which sometimes occur (for example when SiO vapor-deposited at an angle is used) very frequently proved to be unstable and dropped back into twist states. The occurrence of twist states appears to be favored by high spontaneous polarization, in particular when ferroelectric-crystal mixtures are used (in this respect, cf. M. A. Handschy and N. A. Clark; Ferroelectrics 59, 69 (1984)). However, such mixtures are particularly suitable since they result in short switching times.

The object of the present invention is to provide FLC mixtures, comprising at least two components, which exhibit only negligibly small optical hysteresis, and associated ghost images, or none at all, and do not form twist states, but instead uniform states and thus result in high optical contrast.

Surprisingly, it has been found that addition of complex ligands for ions to FLC mixtures can suppress the above-described ghost images and the twist states. It is even possible to cause switching of FLC mixtures having particularly high values for spontaneous polarization ($P_s>35$, in particular>50 nC·cm$^{-2}$), which are otherwise incapable of switching in multiplex mode. A further advantage of the invention is the sudden improvement in contrast.

A further essential advantage is that FLC displays, which frequently become inoperable after relatively long storage, remain switchable even after a relatively long period by means of the FLC mixtures employed according to the invention. Since ionic impurities are responsible for the appearance of ghost images, and since these can be eliminated by addition of an excess of complex ligands, even ionic impurities introduced subsequently and arising, for example, through diffusion from the alignment layer have no adverse consequences.

The FLC light valves according to the invention contain a ferroelectric liquid-crystalline mixture (FLC mixture) which contains at least one compound which is a complex ligand for ions.

The switching and display devices have the following components: a liquid-crystalline mixture according to the invention, outer plates (for example made of glass or plastic) coated with transparent electrodes (two electrodes), at least one alignment layer, spacers, a sealing frame, polarizers and, for color displays, thin colored filter sheets. Other possible components are anti-reflection, passivation, leveling and barrier layers and electrically non-linear elements, such as, for example, thin-film transistors (TFT) and metal-insulator-metal (MIM) elements. The general construction of liquid-crystal displays has already been described in detail in the relevant monographs (for example E. Kaneko, "Liquid Crystal TV Displays: Principles and Applications of Liquid Crystal Displays", KTK Scientific Publishers, 1987, pages 12 to 30 and 163 to 172).

Of FLC light valves, switching devices which are addressed in multiplex mode are preferred. Particular preference is given to liquid-crystal cells which operate in SSFLC ("surface stabilized ferroelectric liquid crystal") mode and in which the cell thickness (i.e. the distance between the outer plates) is from 1 to 20 µm. Particular preference is given to a cell thickness of from 1 to 10 µm, and, in birefringence mode, in particular of 1.2 to 3 µm.

In addition, the compounds according to the invention can advantageously be employed during operation of an SSFLC display in guest-host mode, where the optical effect is not attributed to birefringence phenomena but to anisotropic absorption by dichroic dyes dissolved in an FLC matrix.

The compounds according to the invention suppress the occurrence of optical hysteresis and/or twist states for various geometries of the smectic layers in the SSFLC cell (see, for example, H. R. Dübal et al., Proc. 6th Intl. Symp. on Electrets, Oxford, England 1988). In particular, this applies to the virgin liquid-crystal texture, in which the smectic layers have a chevron geometry, and for the bookshelf or quasi-bookshelf geometry, in which the smectic layers are perpendicular or virtually perpendicular to the glass plates (see Y. Sato et al., Jap. J. Appl. Phys., Vol. 28, 483 (1989)). The use of the FLC mixtures according to the invention in this bookshelf geometry is particularly advantageous since this results not only in good dark states, but also in high transmission of the bright state due to the large effective switching angle.

In addition, it has been shown that the complex ligands according to the invention facilitate field-induced production of a homogeneous quasi-bookshelf geometry in the FLC mixtures (Y. Sato et al., Jap. J. Appl. Phys. Vol. 28, 483 (1989)).

The liquid-crystal mixtures generally comprise 2 to 20, preferably 2 to 15, components, including at least one complex ligand for ions. The other constituents are preferably selected from known compounds having nematic and/or cholesteric and/or tilted smectic phases. These include, for example, Schiff's bases, biphenyls, terphenyls, phenylcyclohexanes, cyclohexylbiphenyls, pyrimidines, difluorophenyls and esters of p-alkylbenzoic acids. Particular preference is given here to mixtures which contain derivatives of phenylpyrimidine, phenylpyridine, or phenylthiadiazole. In general, the commercially available liquid-crystal mixtures, even before addition of the compound(s) according to the invention, are in the form of mixtures of various components, of which at least one is mesogenic, i.e. a compound which, in derivatised form or in a mixture with certain components, exhibits a liquid-crystal phase.

The FLC mixture preferably has an $S_c^*$ phase in the service temperature range and the phase sequence of the mixture on cooling is: I→N*→$S_A$*→$S_C$* or I→N*→$S_C$*.

The complex ligand used in the FLC mixture can be a compound of the general formula (I),

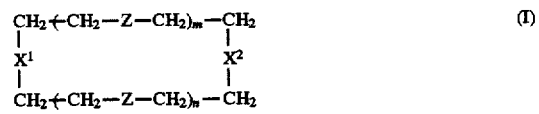

in which

—Z— is —O— or —S—, m and n are integers greater than zero, where m+n equals 2 to 6, —X$^1$— and —X$^2$— are identical or different and are

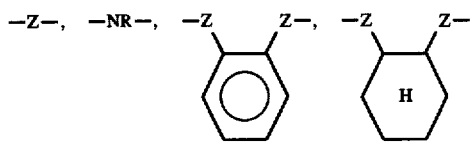

or

—X$^1$— and —X$^2$— together are

N—CH$_2$(—CH$_2$—Z—CH$_2$)$_l$—CH$_2$—N or
N—CO(—CH$_2$—Z—CH$_2$)$_l$—CO—N or
H—C—CH$_2$(CH$_2$—Z—CH$_2$)$_2$—CH$_2$—C—H, where R is alkyl or alkoxy having from 1 to 15 carbon atoms, phenyl, benzyl or benzoyl and l is 1 or 2.

Furthermore, the complex ligand used in the FLC mixture can be a compound of the general formula (II)

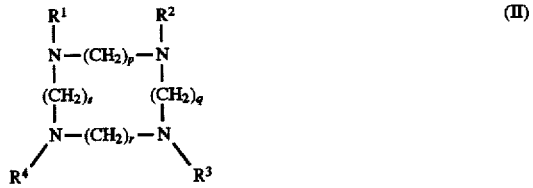

where R$^1$, R$^2$, R$^3$ and R$^4$, independently of one another, are —H, —(C$_1$–C$_{12}$)alkyl,

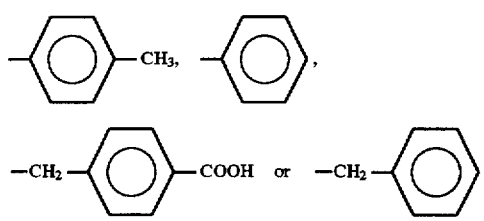

and p, q, r and s, independently of one another, are an integer from 2 to 4, and where p+q+r+s equals 8 to 16.

The complex ligands employed to reduce optical hysteresis and to eliminate twist states are preferably electrically neutral compounds.

These compounds preferably contain at least two nitrogen and/or oxygen and/or sulphur and/or phosphorus donor centers and are preferably complex ligands for cations.

These compounds are particularly preferably medio- or macrocycles (8 to 12 ring members=mediocycles, ≧13= macrocycles according to Römpps Chemie Lexikon [Römpp's Lexicon of Chemistry] 8th Edition, Franksche Verlagsbuchhandlung, Stuttgart, 1989).

The compounds used in FLC mixtures according to the invention are, in particular, cryptands, coronands and podands, preferably in concentrations of from 0.01 to 10 mol-%, based on the total mixture. Very particular preference is given to cyclic compounds containing 16 or more ring members. Bicyclic ligands of the cryptand type are preferred.

For a classification of said complex ligands, reference is made to E. Weber and F. Vögtle, Inorganica Chimica Acta, Vol. 45, (1989) L65-L67. The ligand topologies listed therein are reproduced below:

open chain

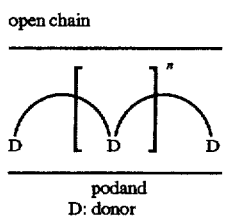

podand
D: donor cyclic

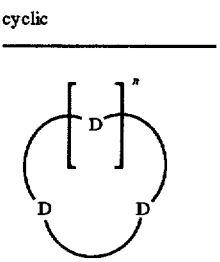

coronand
D ≅ O: crown ether spherical

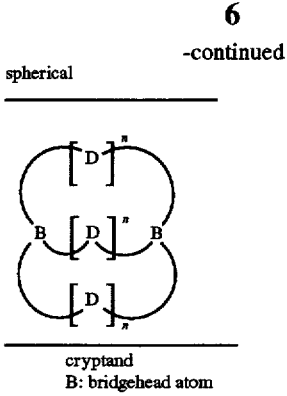

cryptand
B: bridgehead atom

A-C: acyclic (podands); D-F: monocyclic (coronands);
G-H: bicyclic (coronands, cryptands); I-K: tricyclic (cryptands).

Typical examples of coronands are:

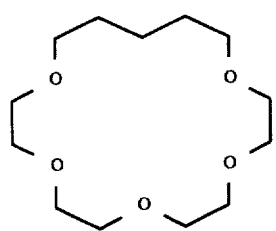
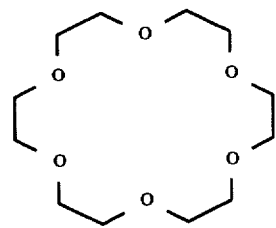
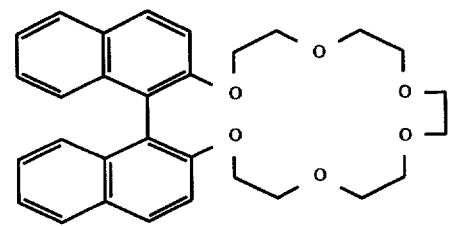
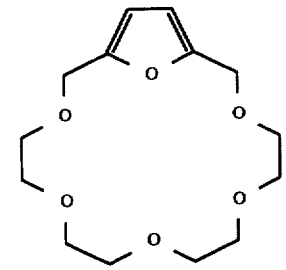
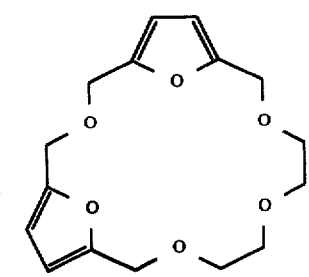
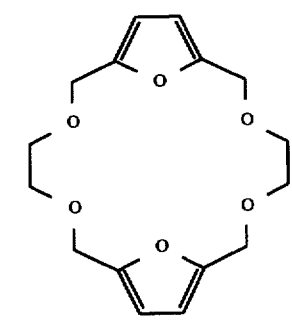

-continued
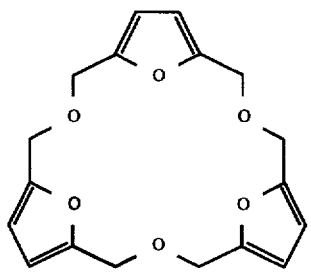
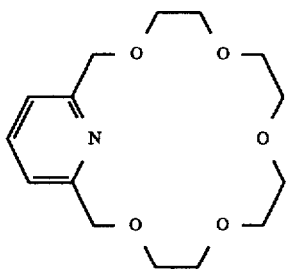
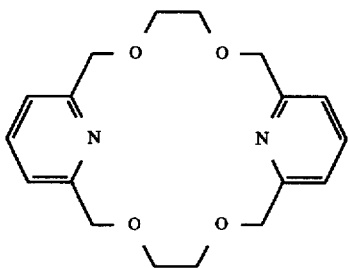
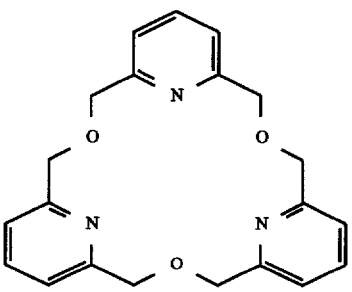
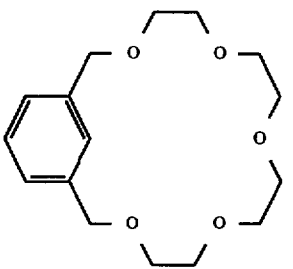
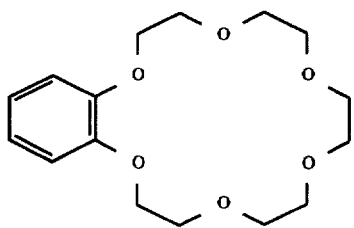

-continued
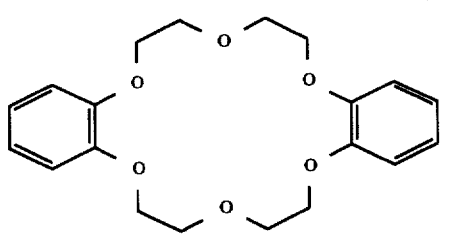
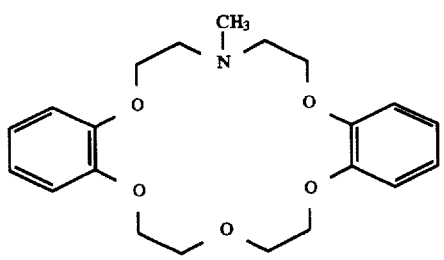
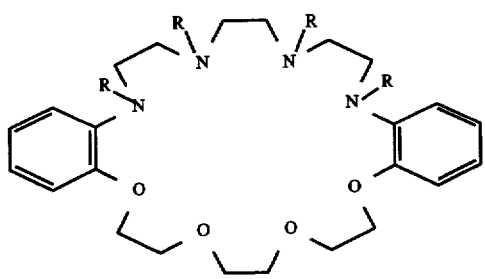
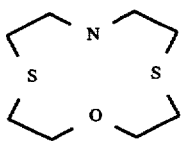
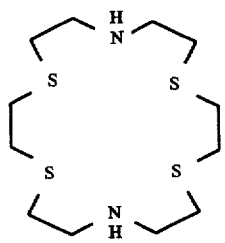
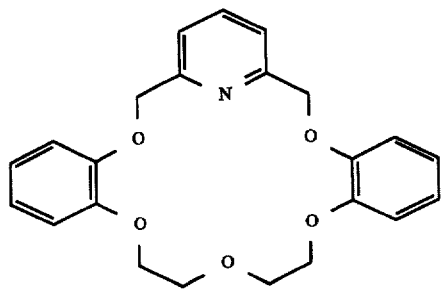

-continued
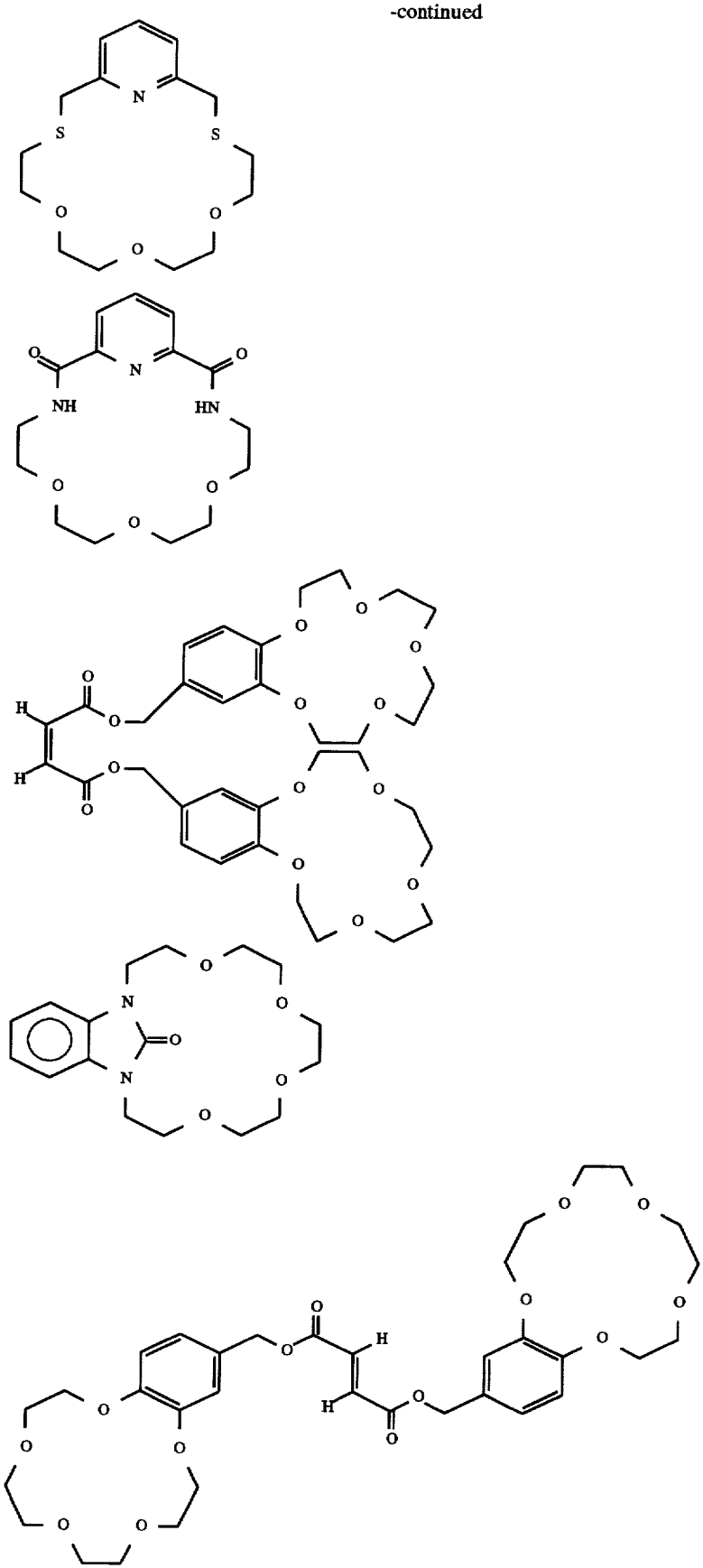

-continued
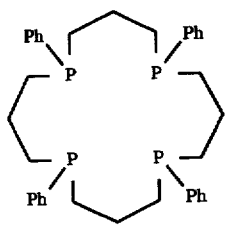
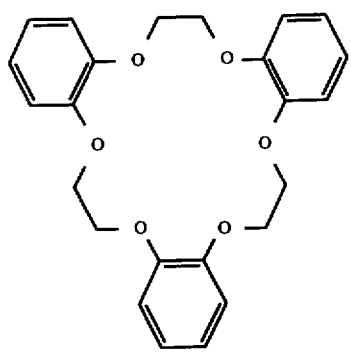
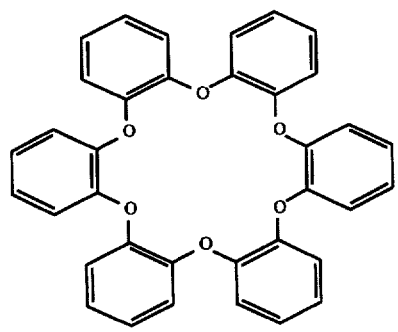
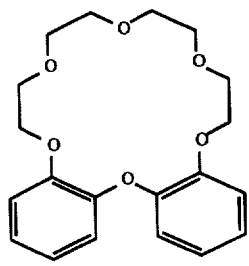
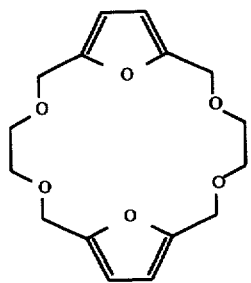

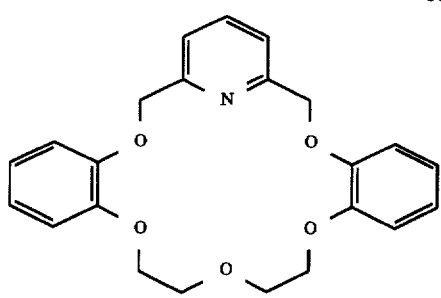
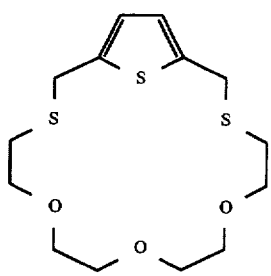
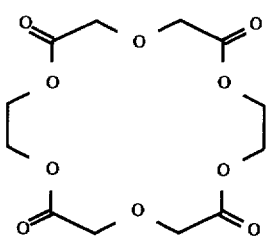
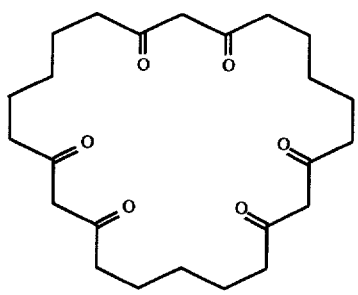
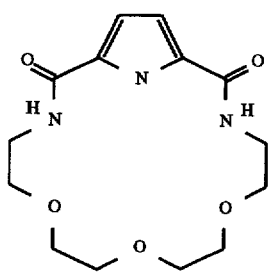

-continued
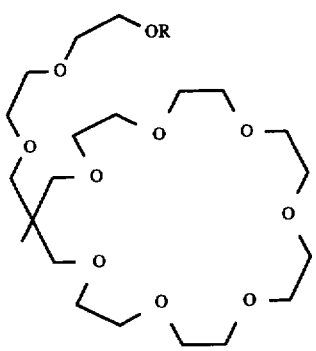
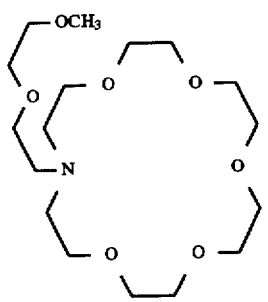
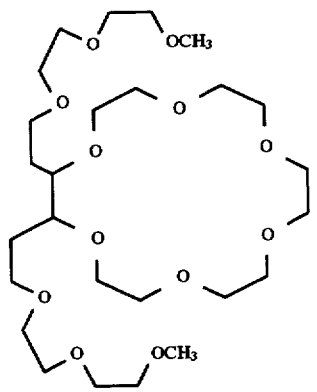
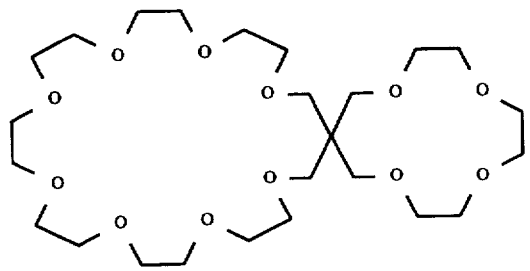
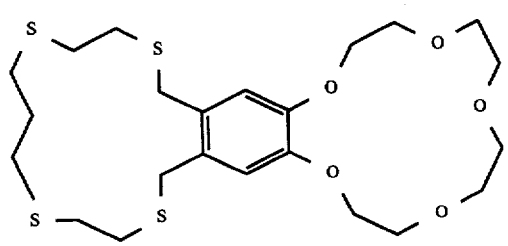

-continued
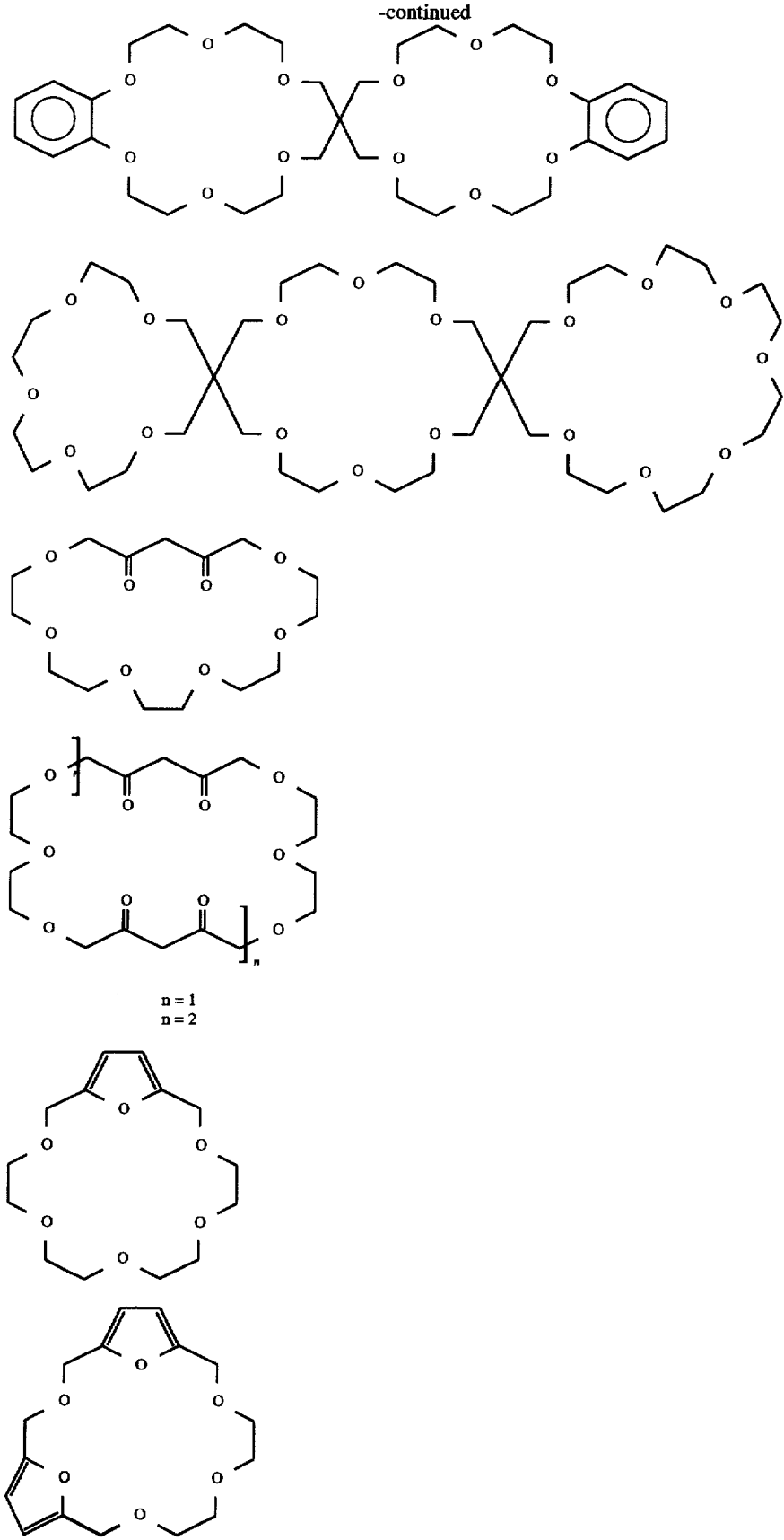
n = 1
n = 2

-continued
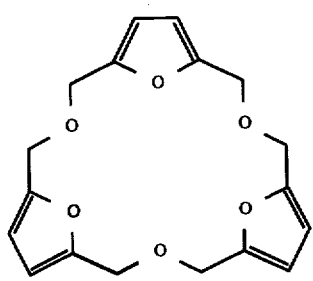
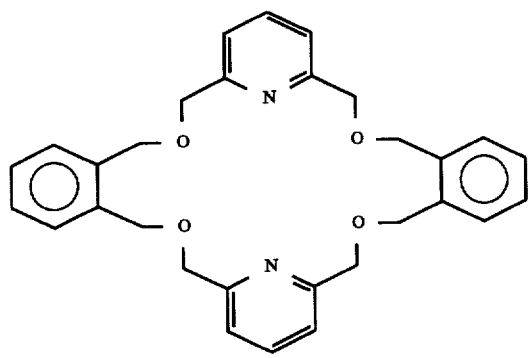
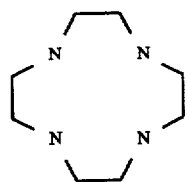
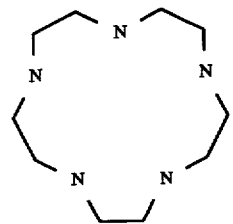
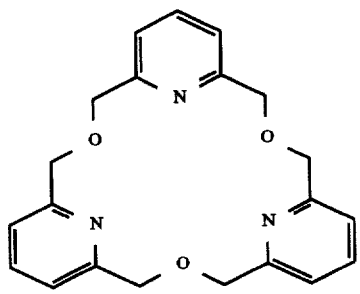

-continued
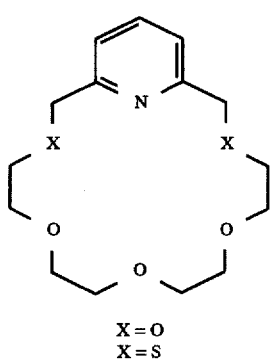
X = O
X = S
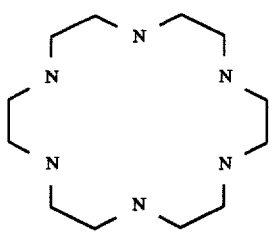
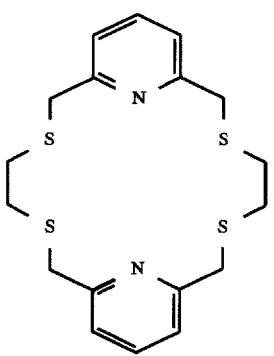
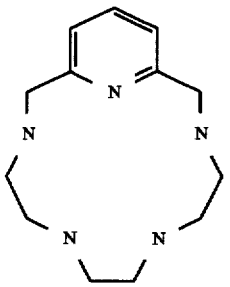
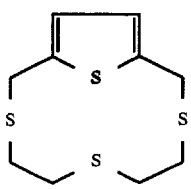

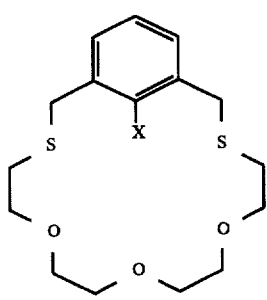
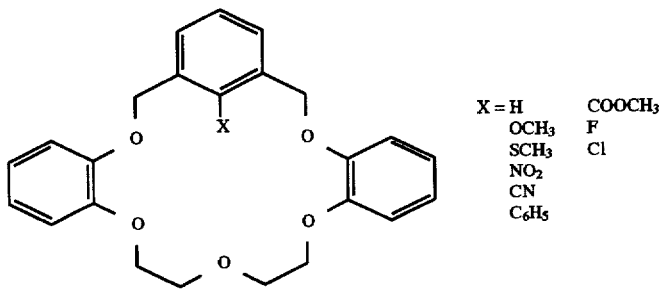
X = H, OCH₃, SCH₃, NO₂, CN, C₆H₅, COOCH₃, F, Cl
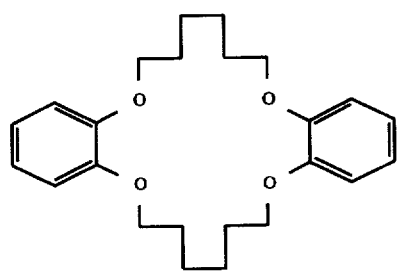
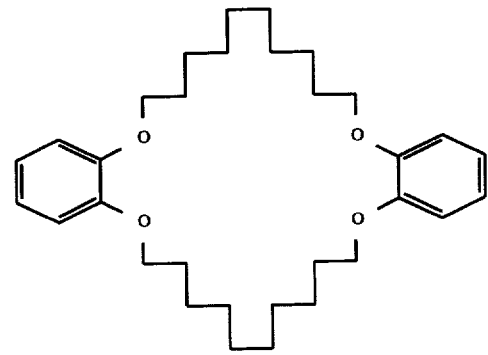
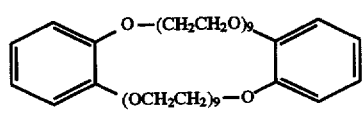
30
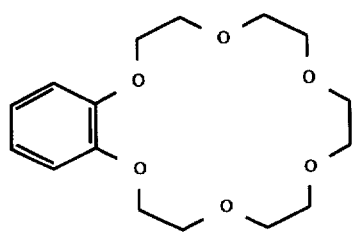

-continued
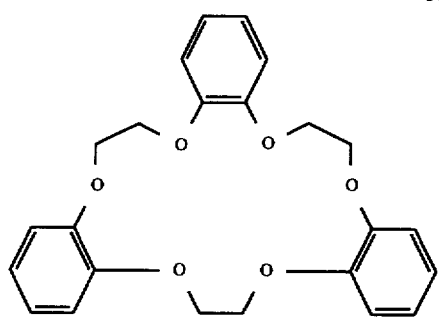
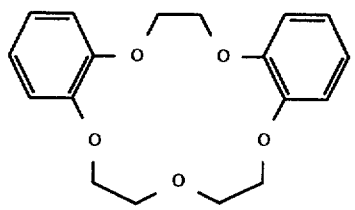
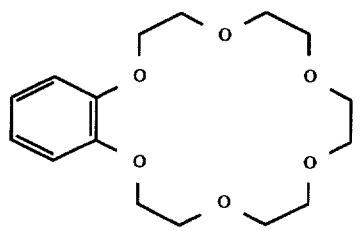
22
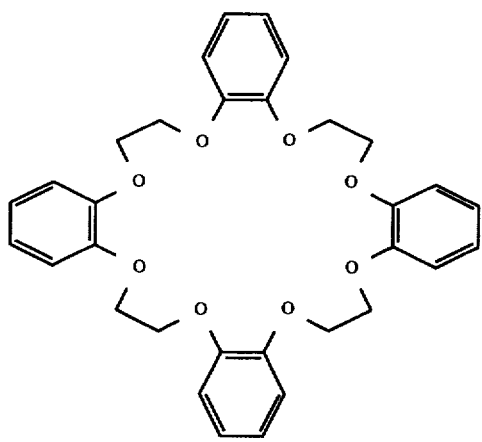
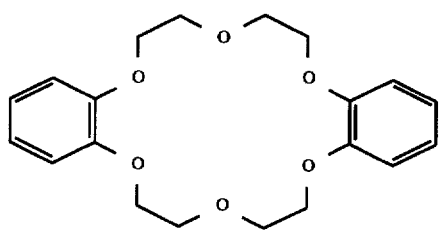

-continued
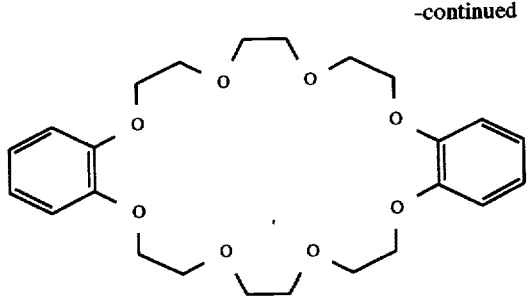
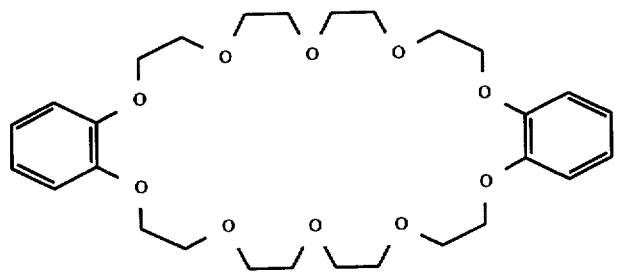
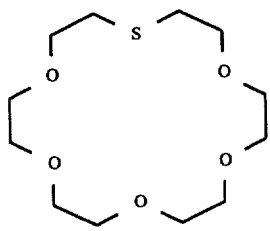
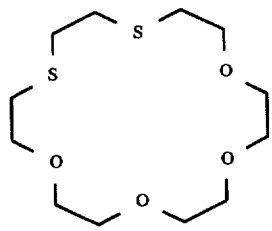
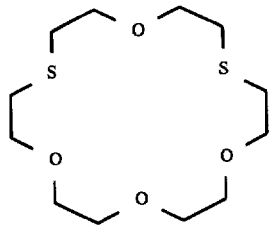
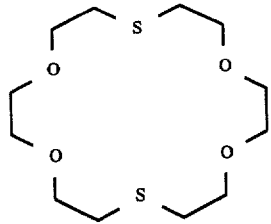

-continued
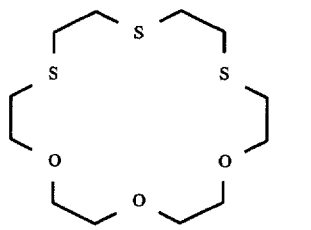
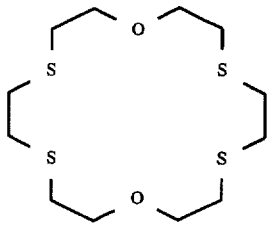
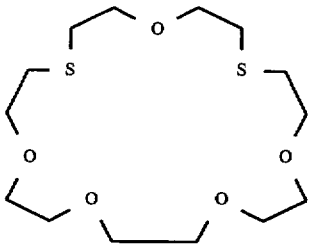
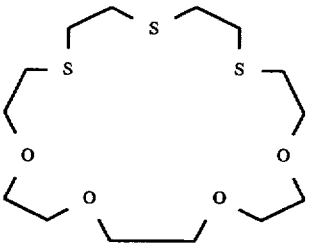
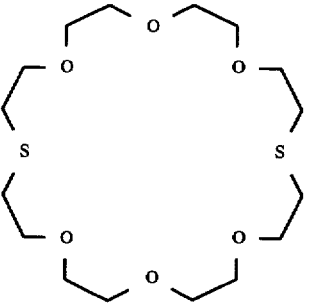
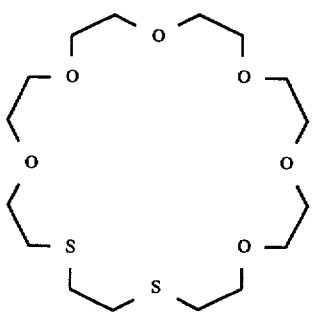

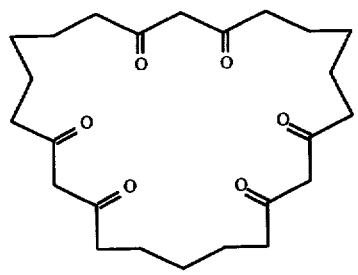
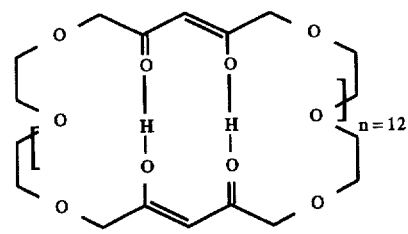
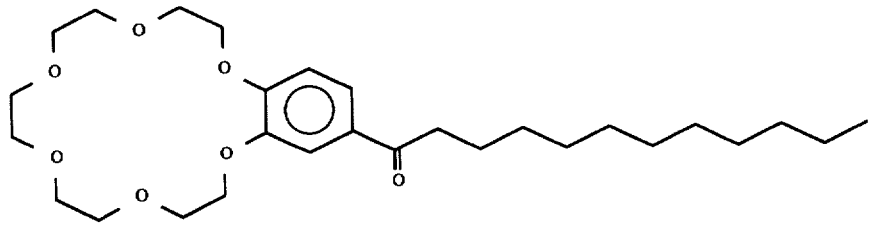
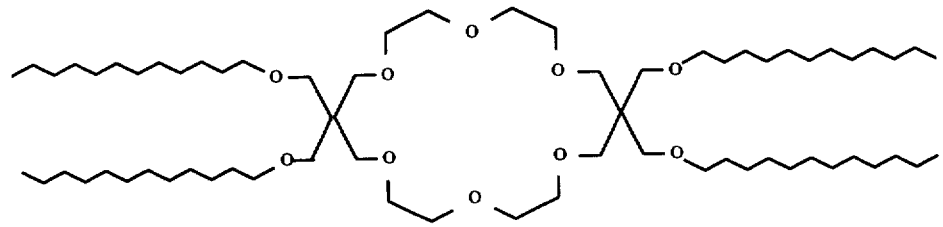
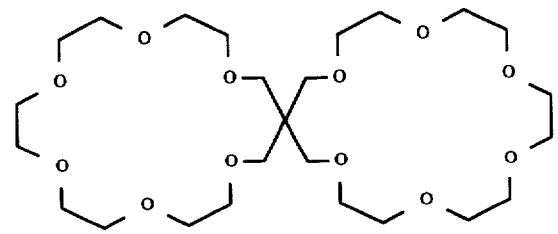
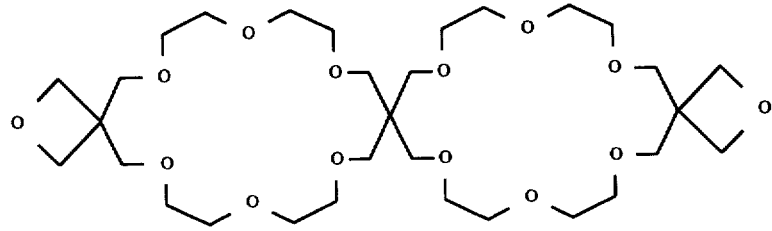

Typical examples of cryptands are:
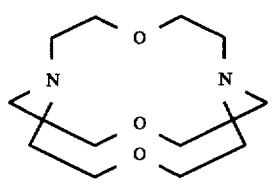
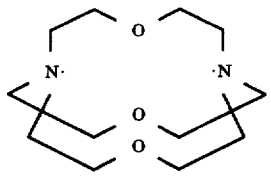
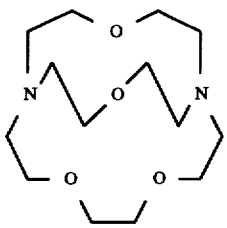
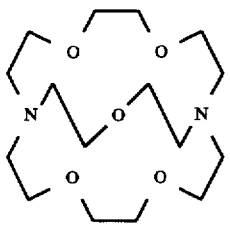
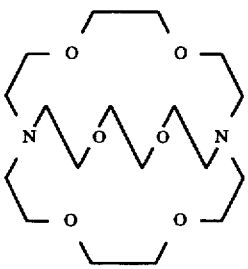
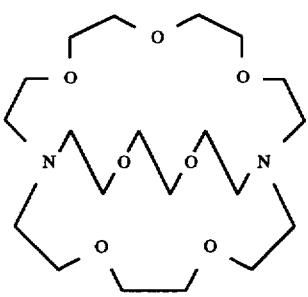
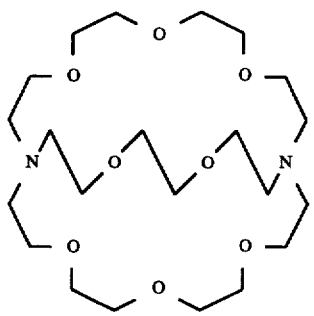
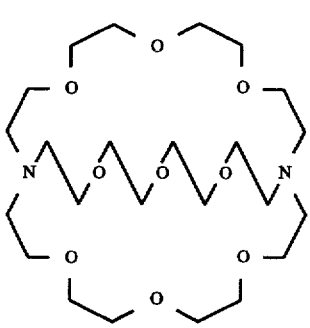
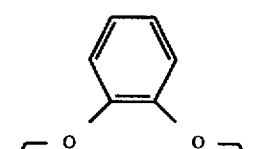
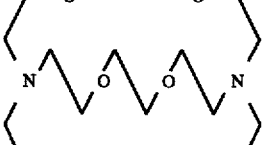
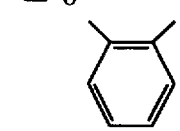
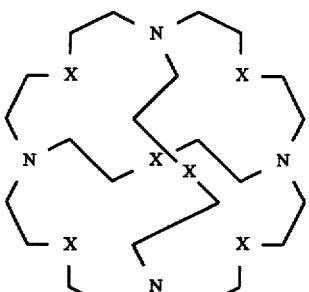
X = O−
X = (CH$_2$)$_2$

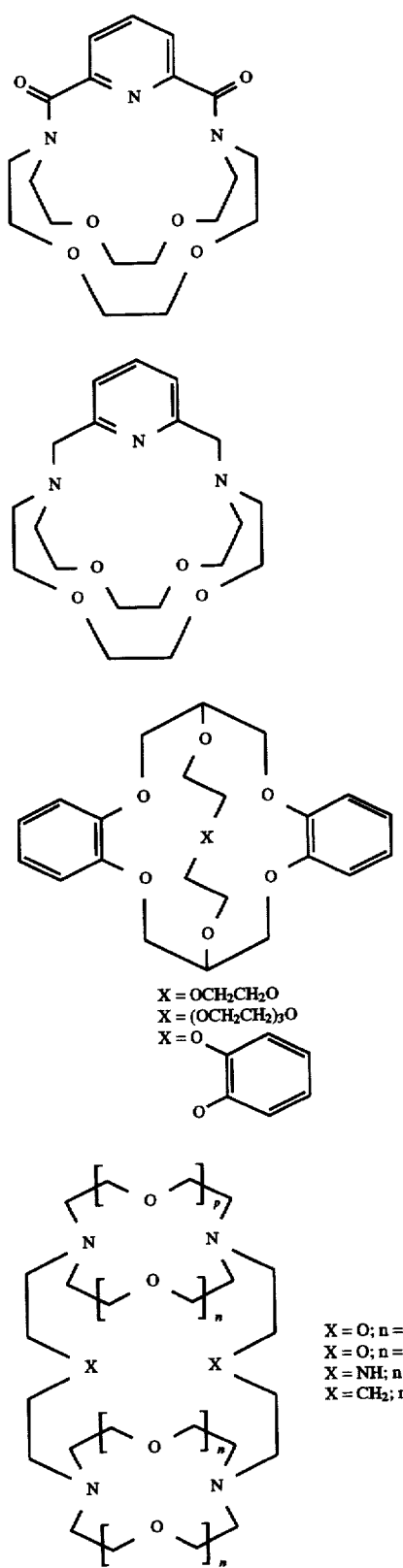
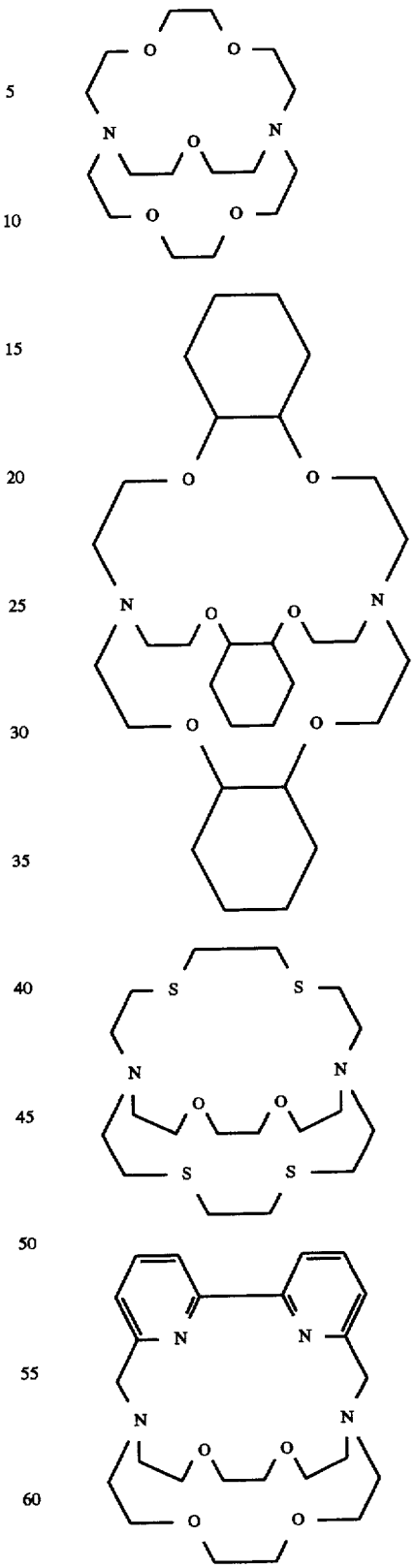

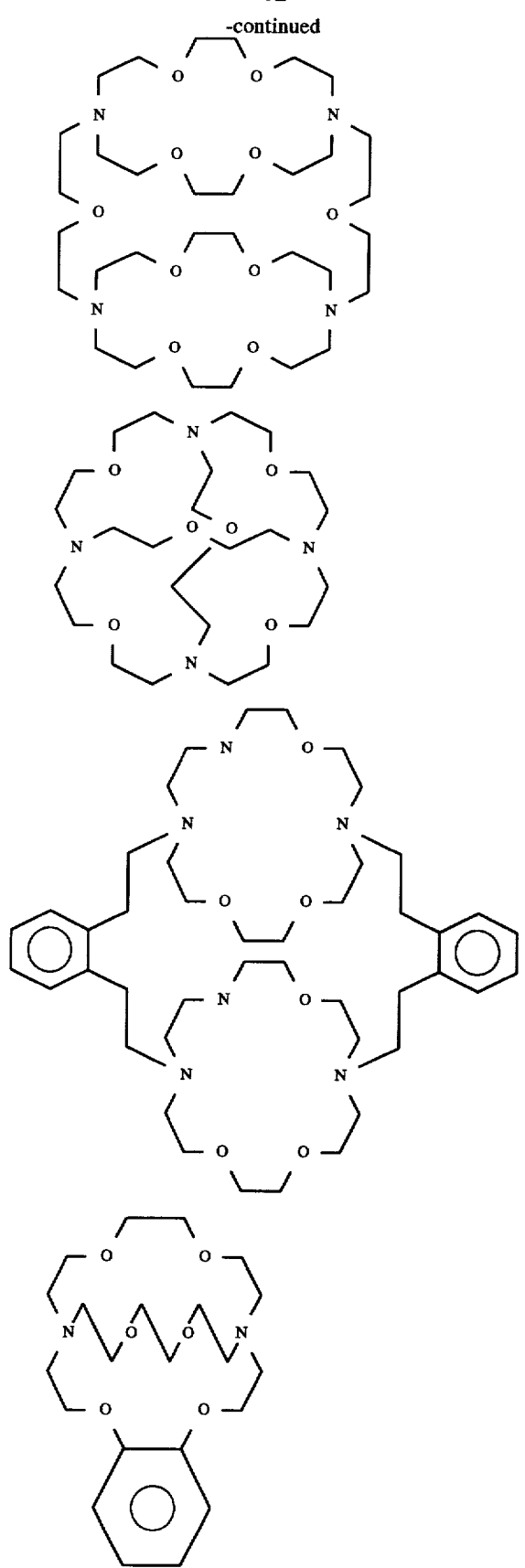
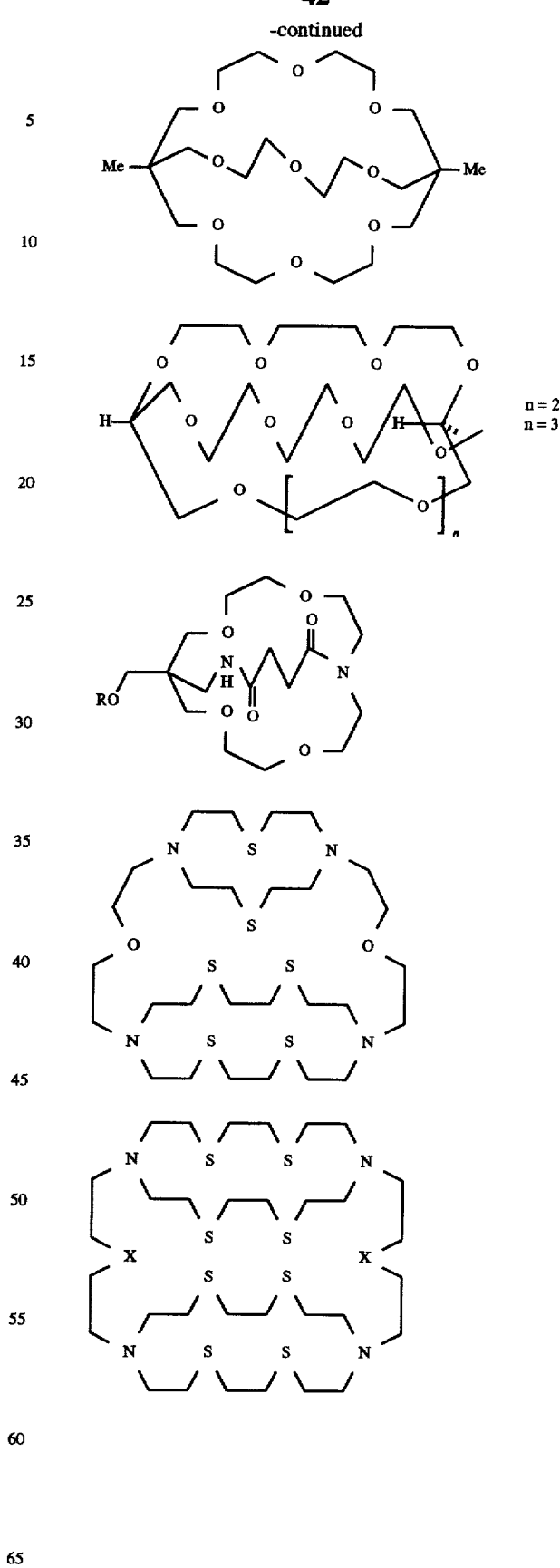

43
-continued
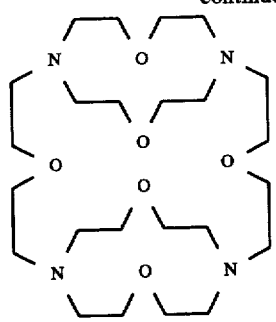
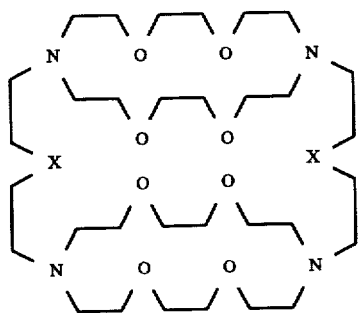
44
-continued
X = O
X = CH₂
X = o-phenylene
X = NH
Characteristic representatives of podands are:
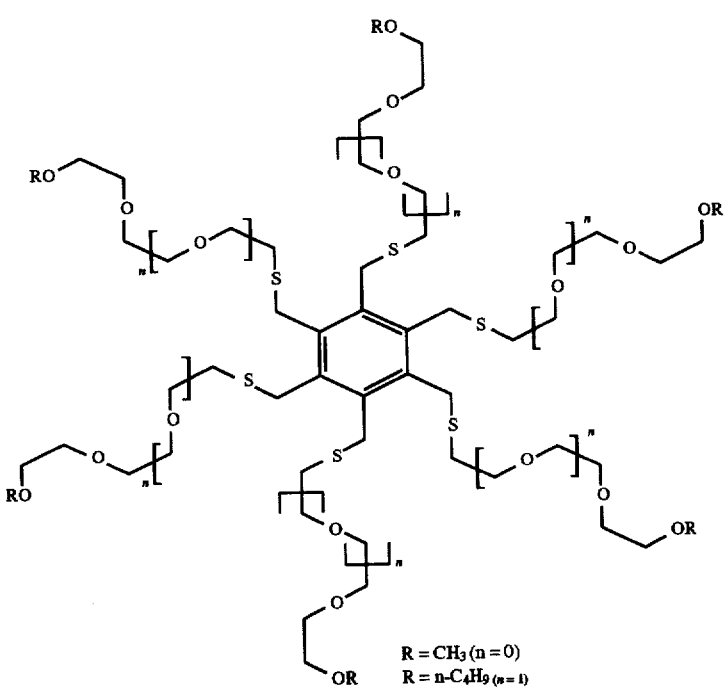
R = CH₃ (n = 0)
R = n-C₄H₉ (n = 1)
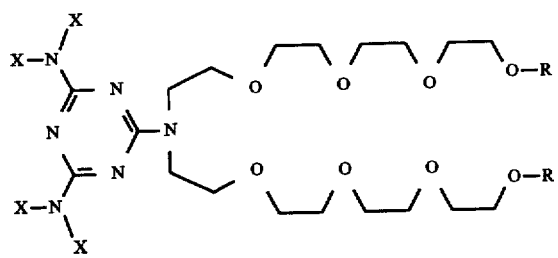

-continued
R = n-C$_4$H$_9$
R = n-C$_8$H$_{17}$
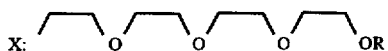
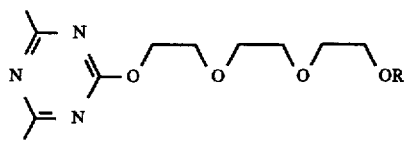
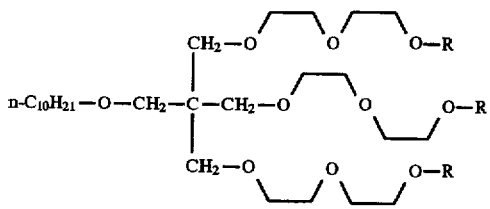
R = H
R = CH$_2$CH$_2$OH
R = n-C$_8$H$_{17}$
R = CH$_2$CH$_2$O-n-C$_8$H$_{17}$
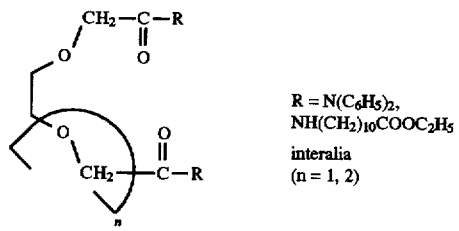
R = N(C$_6$H$_5$)$_2$,
NH(CH$_2$)$_{10}$COOC$_2$H$_5$
interalia
(n = 1, 2)
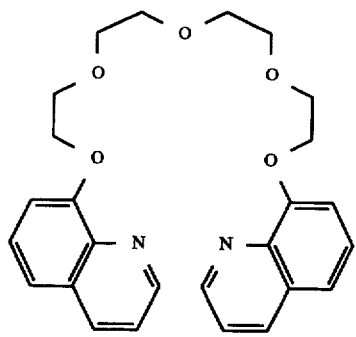
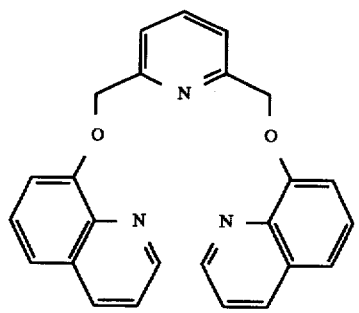
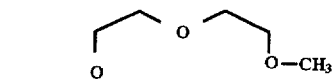
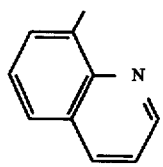

-continued
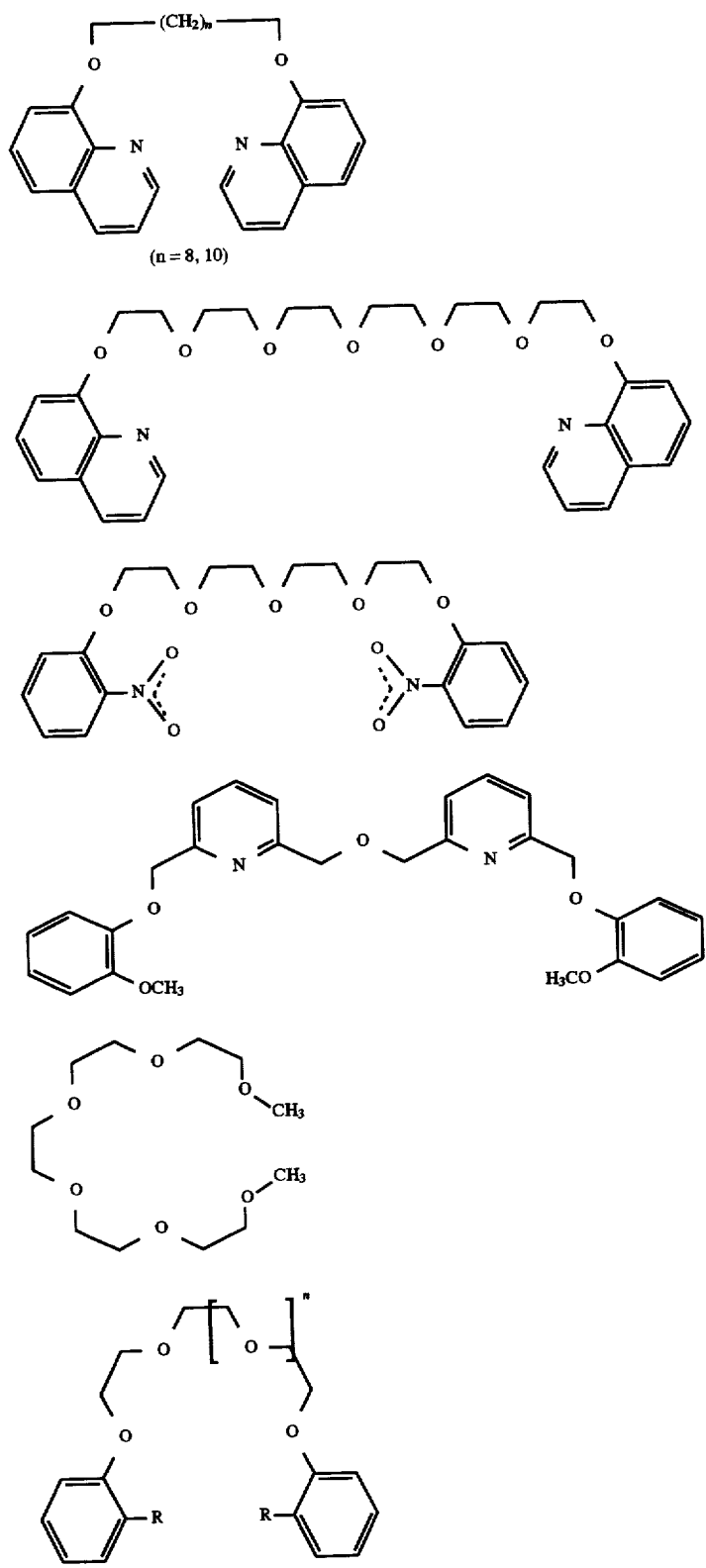

-continued
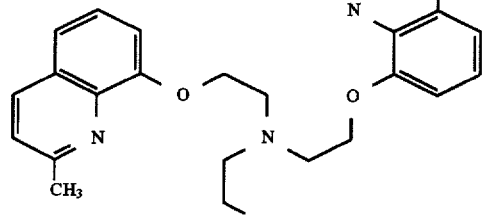
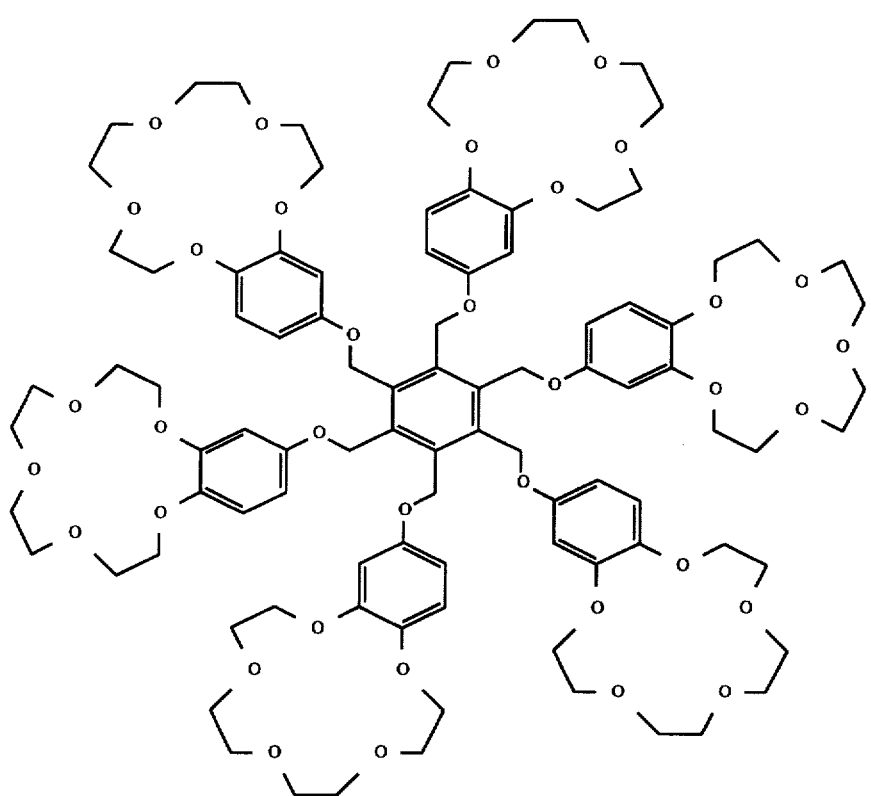
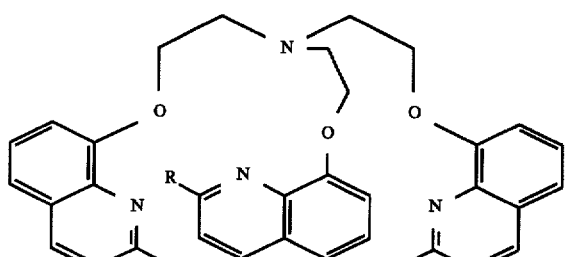
R = H, CH₃

-continued

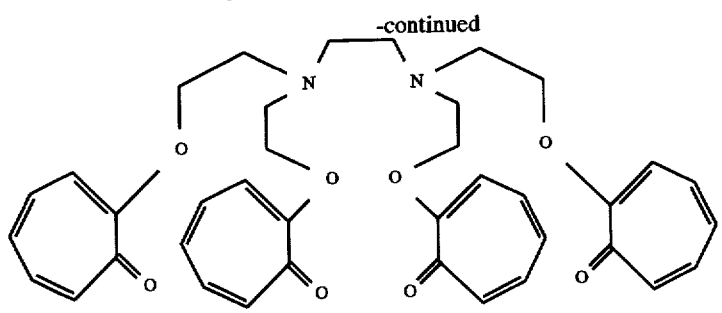

Particular preference is given to complex ligands which complex alkali metal and alkaline earth metal ions. Macrocycles, preferably having a ring size of 18, which contain at least two nitrogen atoms and optionally 5 or 6 oxygen atoms as donor centers and have bicyclic or tricyclic structure have proven particularly suitable.

The complex ligands are preferably employed in FLC mixtures which contain, as chiral components, oxirane ether and/or oxirane ester and/or dioxolane derivatives. Of chiral dopes having two centers of chirality, both the cis- and trans-configured compounds are suitable (see DE-A 36 33 968 and DE-A 37 18 174). Other dopes which are suitable for use with the complex ligands employed according to the invention are described in DE-A 39 07 601, DE-A 38 32 502, DE-A 38 32 503, DE-A 38 27 599, DE-A 37 13 273, DE-A 37 03 228, DE-A 36 30 933, DE-A 36 18 213, DE-A 36 17 826 and DE-A 36 20 049.

Since the complex ligands used according to the invention make it possible to use ferroelectric liquid-crystal mixtures of high spontaneous polarization, and since these are distinguished by particularly short switching times, the complex ligands are preferably used in FLC mixtures having a spontaneous polarization>30 nC·cm$^{-2}$, as described, for example, in DE-A 39 09 354.

It has been shown that the complex ligand according to the invention always result in an increase in the electrical conductivity. This is particularly pronounced if the complex ligands employed are cryptands. In this case, the optical hysteresis and the twist states are eliminated particularly efficiently.

If the FLC light valves are addressed in multiplex mode, the ratio (=bias) between the line voltage and the gap voltage (data pulse level) is an important parameter with a crucial effect on the contrast in operation (see T. Harada et al., Japan Display Conference 1986). High bias values prove to be particularly favorable here. Of the complex ligands according to the invention, the cryptands, in particular, result in extraordinarily high bias values.

In a further embodiment, the mixtures according to the invention contain a plurality of different complex ligands, each of the various complex ligands being able to preferentially complex certain cations (on the question of selectivity, see, for example, M. Hiraoka, Crown Compounds—Their characteristics and applications, Kodansha Ltd., Tokyo, 1982, p. 67 ff.). The FLC mixture here again contains a total of from 0.01 to 10 mol-% of complex ligands. Since the introduction of complex ligands is frequently associated with problems of solubility in the FLC mixture or effects on the liquid-crystalline phases, it may be advantageous, for problem-free use of the complex ligands, to preferably use mixtures of coronands and cryptands. In this case, too, a total of from 0.01 to 10 mol-% are employed.

For the alignment of the liquid crystal, organic materials containing a polyimide or polyamide as the base component are generally employed (in this respect, cf. Mol. Cryst. Liq. Cryst. 109, I (1984)). However, it has been shown that an alignment layer comprising SiO$_2$ is particularly suitable for the FLC mixtures according to the invention. The SiO$_2$ films are preferably obtained by spin-coating or spraying or by dipping into organosilicon compounds, with subsequent thermal treatment at from 100° to 400° C. The alignment capacity of the SiO$_2$ films is achieved in a conventional manner by rubbing the film (in this respect, cf. DE-A-28 52 395, EP-A 0 046 401, DE-A 27 22 900). A further advantage of the rubbed SiO$_2$ films is the significantly improved insulation capacity compared with polyimides and the high transparency, even for thick cells.

The mixtures described are particularly suitable as components for liquid-crystal, switching and display devices, as described at the outset.

BRIEF DESCRIPTION OF THE DRAWINGS

FIG. 1 shows pulse addressing (CH1) and the optical transmission (CH2) of a test cell containing a FLC mixture without addition of complex ligand (left-hand side) and a FLC mixture in accordance with the invention (right-hand side);

FIG. 2 shows photo micrographs of the stable dark state and the stable bright state of test cells containing a FLC mixture without addition of complex ligand (left-hand side) and a FLC mixture in accordance with the invention (right-hand side);

FIG. 3 shows optical transmission plotted against time of a test cell containing a FLC mixture without addition of complex ligand (FIG. 3a) and a FLC mixture in accordance with the invention (FIG. 3b);

FIG. 4 shows optical transmission plotted against time of a test cell containing a FLC mixture without addition of complex ligand (FIG. 4a) and a FLC mixture in accordance with the invention (FIG. 4b)

Figure 5:
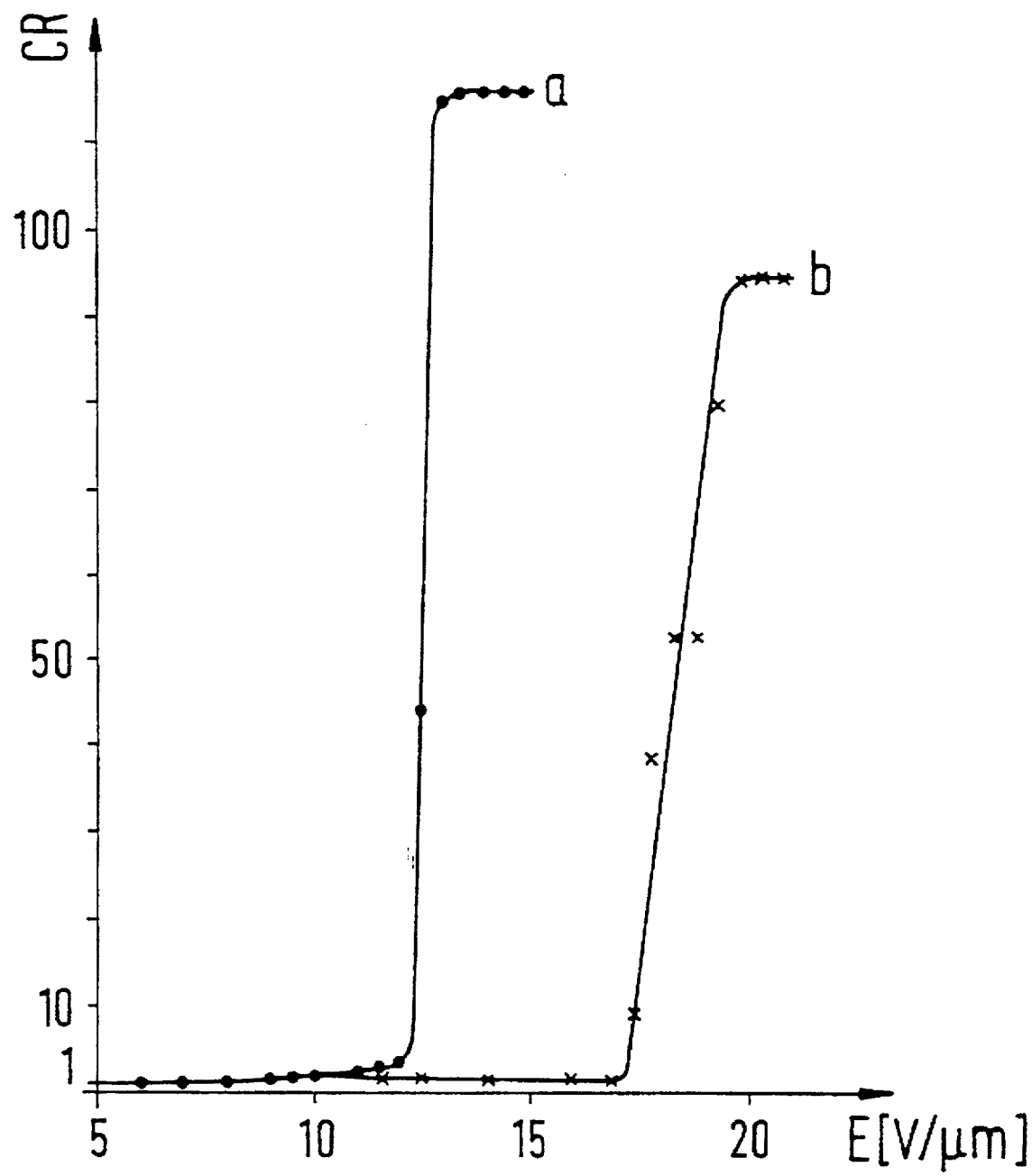
FIG. 5 shows contrast (CR) plotted against field strength (E) for a FLC mixture according to the invention (curve a) and for a FLC mixture without addition of complex ligand (curve B).

The invention is illustrated in greater detail by the examples below:

EXAMPLES

In the examples below, the cryptands and coronands are employed in concentrations of from 0.5 mol-% to 1.5 mol-%. Examples of coronands and cryptands are the compounds K1 to K12 below.

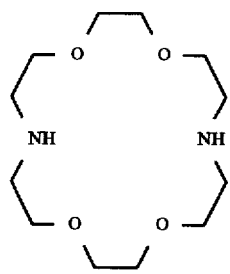

1,7,10,16-Tetraoxa-4,13-diazacyclooctadecane
(Kryptofix® 22)

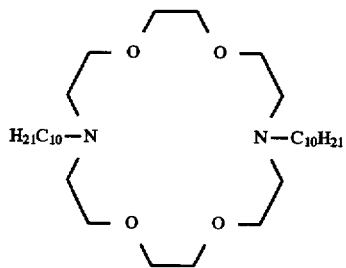

4,13-Didecyl-1,7,10,16-tetraoxa-4,13-diazacyclooctadecane
(Kryptofix® 22 DD)

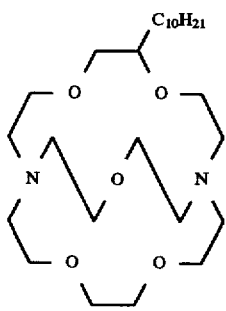

5-Decyl-4,7,13,16,21-pentaoxa-1,10-diazabicyclo[8.8.5]-tricosane
(Kryptofix® 221D)

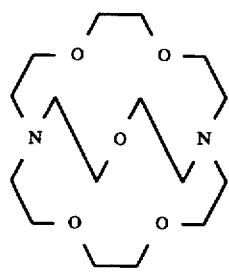

4,7,13,16,21-Pentaoxa-1,10-diazabicyclo[8.8.5]-tricosane
(Kryptofix® 221)

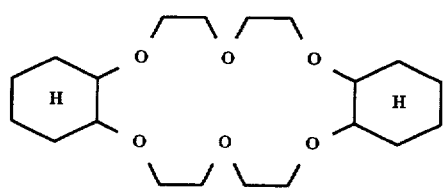

2,5,8,15,18,21-Hexaoxatricyclo[20.4.0.0$^{9,14}$]hexacosane

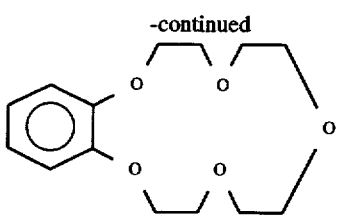

1,4,7,10,13-Pentaoxa[13]orthocyclophane

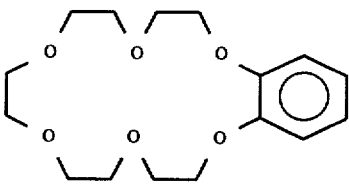

1,4,7,10,13,16-Hexaoxa[16]orthocyclophane

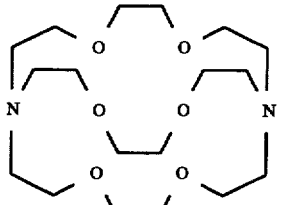

4,7,13,16,21,24-Hexaoxa-1,10-diazabicyclo[8.8.8]hexacosane
(Kryptofix® 222)

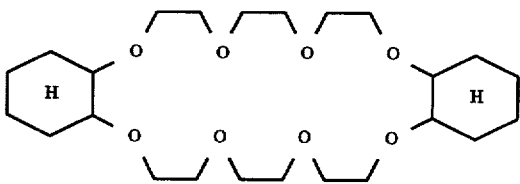

2,5,8,11,18,21,24,27-Octaoxatricyclo[26.4.0.0$^{12,17}$]dotriacontane

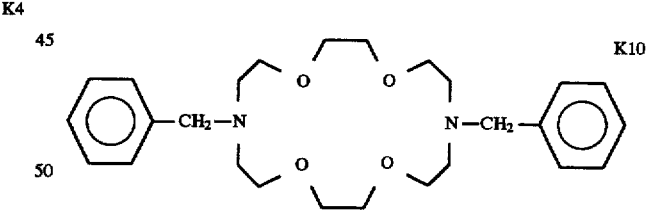

4,13-Dibenzyl-1,7,10,16-tetraoxa-4,13-diazabicyclooctadecane

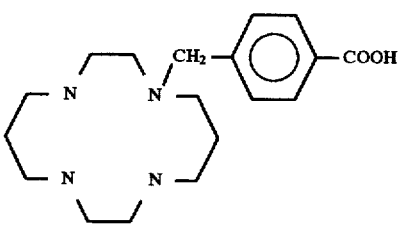

1-[4-Carboxybenzyl]-1,4,7,11-tetracyclotetradecane

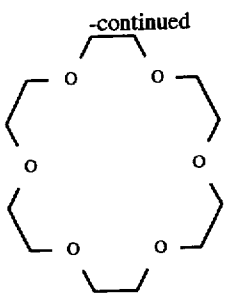

1,4,7,10,13,16-Hexaoxacyclooctadecane (18-crown-6)

In the examples, three liquid-crystal base mixtures A, B and C, various chiral dopes and an FLC mixture containing a dye (quest-host system) are employed.

LC mixture A contains the following three components (in mol-%):

33.75  $H_{21}C_{10}-O-\text{[Ph]}-CO-O-\text{[Ph]}-OC_6H_{13}$  (A 1)

41.25  $H_{17}C_8-O-\text{[Ph]}-CO-O-\text{[Ph]}-O-C_6H_{13}$  (A 2)

25.00  $H_{17}C_8-O-\text{[Ph]}-CO-O-\text{[Ph]}-OC_{11}H_{23}$  (A 3)

The mixture exhibits the following phase sequence:

$S_c$ 72 $S_A$ 74 N 88 I

LC mixture B contains the following eight components (in mol-%):

5.11  $H_{17}C_8-O-\text{[pyr]}-\text{[Ph]}-O-C_8H_{17}$ 11.67  $H_{17}C_8-O-\text{[pyr]}-\text{[Ph]}-OC_4H_9$ 9.28  $H_{17}C_8-O-\text{[pyr]}-\text{[Ph]}-OC_{10}H_{21}$ 17.50  $H_{25}C_{12}-\text{[pyr]}-\text{[Ph]}-OCO-\text{[Cy-H]}-C_5H_{11}$ 17.70  $H_{17}C_8-\text{[pyr]}-\text{[Ph]}-OC_6H_{13}$ 11.80  $H_{17}C_8-\text{[pyr]}-\text{[Ph]}-OC_{10}H_{21}$ 15.88  $H_{17}C_8-\text{[pyr]}-\text{[Ph]}-OC_8H_{17}$ 11.06  $H_{17}C_8-O-\text{[pyr]}-\text{[Ph]}-OC_6H_{13}$ The mixture exhibits the following phase sequence:

$S_c$ 69 $S_A$ 76 N 92 I

LC mixture C contains the following eight components (in mol-%):

13.39  $H_{17}C_8-O-\text{[pyr]}-\text{[Ph]}-OC_6H_{13}$ 4.49  $H_{17}C_8-O-\text{[pyr]}-\text{[Ph]}-OC_6H_{13}$ 14.78  $H_{17}C_8-O-\text{[pyr]}-\text{[Ph]}-OC_4H_9$ 8.14  $H_{17}C_8-O-\text{[pyr]}-\text{[Ph]}-OC_{10}H_{21}$ 8.16  $H_{17}C_8-O-\text{[pyr]}-\text{[Ph]}-OC_{12}H_{25}$ 19.04  $H_{21}C_{10}-\text{[pyr]}-\text{[Ph]}-O-CO-\text{[Cy-H]}-C_5H_{17}$ 12.00  $H_{17}C_8-\text{[pyr]}-\text{[Ph]}-OC_{12}H_{25}$ 20.00

[chemical structure: H17C8-pyridazine-phenyl-OCO-C6H13]

The mixture exhibits the following phase sequence:

S_c 71 S_A 78 N 93 I

Examples of the dopes employed are the following compounds:

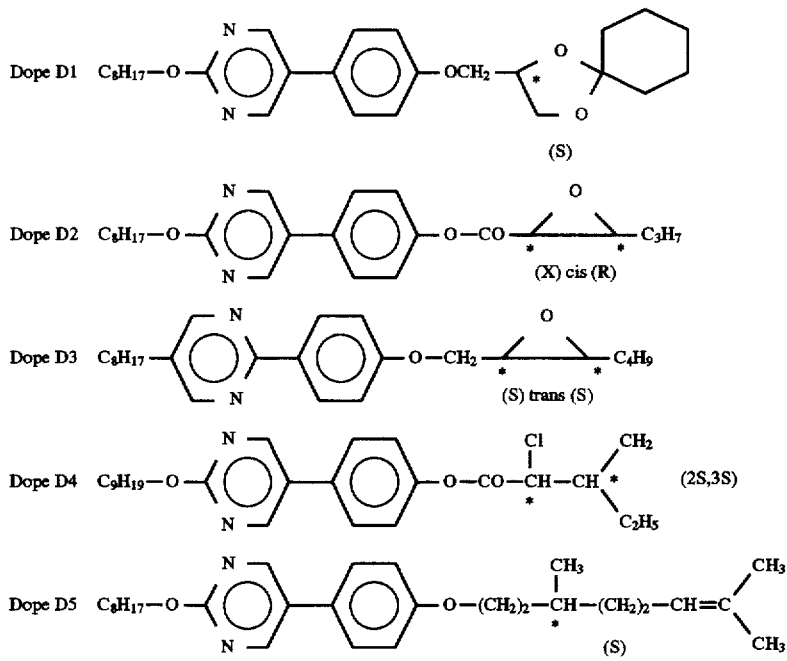

The following examples according to the invention are produced from said LC base mixtures, dopes and additives K1 to K12, taking into account the above data:

Example 1

As described at the outset, twist states result in a considerable reduction in contrast, in particular because the opaque state becomes considerably less dark. Compared with uniform states, twist states additionally have a smaller angle (2 $\theta_{eff}$) between the two switching states. Since the transmission in the bright switching state is proportional to sin$^2$ (4 $\theta_{eff}$) and 2 $\theta_{eff}$ should ideally be 45°, the brightness of a display also decreases if 2 $\theta_{eff}$ is small. In the chevron texture, compared with the bookshelf geometry, a reduction in the switching angle is also obtained, as a consequence of the specific layer structure.

The formation of twist states results in small angles between the memory states and gray dark states not only in FLC mixtures, but also in LC mixtures having achiral, tilted smectic phases.

In order to suppress twist states, 2 mol-% of coronand K5 are added to the achiral LC mixture A (S_c phase), and the mixture is introduced into a commercially available, 2 µm thick test cell provided with electrodes and having a rubbed polyimide at the alignment layer (manufacturer E.H.C. Inc., Tokyo). The alignment of the liquid crystal is achieved by slowly cooling the test cell, the phase sequence described in the introduction occurring. The effect is characterized using the angle (2 $\theta_{eff}$) between the two memory states in the chevron texture. The angles are measured by examining the filled test cell under a polarizing microscope equipped with a rotary stage with angle scale. The corresponding angles of the mixture with and without coronand are shown in Table 1. This angle increases from 20° to 28° on addition of coronand K5.

Example 2

FLC mixture M1 has the following composition (in mol-%):

| | |
|---|---|
| LC mixture B | 78.3% |
| Dope D1 | 4.7% |
| Dope D2 | 9.0% |
| Dope D3 | 8.0% | and the phase sequence Si_c* 60 S_A* 70 N* 89 I and a spontaneous polarization of 55 nC·cm$^{-2}$.

The effective switching angle (2 $\theta_{eff}$), the transmission in the dark and bright states and the optical contrast are measured for various cryptands and coronands added to the FLC mixture M1, in each case in an amount of 1 mol-%. To this end, the measurement cell provided with electrodes (manufacturer E.H.C. Inc., Tokyo) containing the corresponding FLC mixture is examined under a polarizing microscope equipped with a rotary stage. When the cell is driven, the effective switching angle can be determined by rotating the microscope stage between the two switching states.

The transmission in the bright and dark states is measured using a photodiode under the polarizing microscope. The optical contrast is calculated from the ratio between the transmissions in the bright and dark states.

The results are shown in Table 2. After addition of the corresponding cryptands or coronands, FLC mixture M1 exhibits considerably better properties, which is reflected in the corresponding measurement results.

Example 3

FLC mixture M2 has the following composition (in mol-%):

| LC mixture B | 84.0% |
|---|---|
| Dope D1 | 7.7% |
| Dope D2 | 8.3% | and the phase sequence $S_c^*$ 63 $S_A^*$ 73 N* 81 I and a spontaneous polarization of 37 nC·cm$^{-2}$. In order to suppress optical hysteresis, 1 mol-% of the complex ligand K8 was added to the FLC mixture M2. Addition of the cryptand K8 gave the phase sequence $S_c^*$ 58 $S_A^*$ 71 N* 78 I and a spontaneous polarization of 36 nC·cm$^{-2}$. FIG. 1 shows the optical switching responses of the FLC mixture M2 with and without cryptand in test cells 2.1 µm thick (manufacturer E.H.C. Inc., Tokyo), under a polarizing microscope. The switching of the test cells was recorded using a fast photodiode. FIG. 1 shows pulse addressing (CH1) and the optical transmission (CH2) of a test cell filled with FLC mixture M2 at a temperature of 25° C. and variable pulse intervals. The left-hand side shows the pure mixture M2, while the results with 1 mol-% of cryptand K8 are shown on the right-hand side.

For pulse addressing at a temperature of 25° C., bipolar pulses having an overall width of 200 µs and a height of 4 V/µm were used. The intervals between the pulses were a) 1000 ms, b) 100 ms and c) 20 ms. It can clearly be seen that the FLC mixture containing the cryptand K8 (right-hand side of FIG. 1) exhibits improved switching behavior and is also switchable for longer pulse intervals (a). Corresponding photo micrographs of the test cells (FIG. 2) show, for the FLC mixture M2, non-switchable regions, which only occur to a considerably reduced extent after K8 has been added. FIG. 2 shows photo micrographs of the test cells filled with FLC mixture M2 (left-hand side) and FLC mixture M2 additionally containing 1 mol-% of cryptand K8 (right-hand side). a) shows the stable dark state and b) the stable bright state. The constant parameters are field strength 4 V/µm, pulse width 200 µs, and pulse interval 50 ms at a temperature of 25° C.

The following test method was used to obtain a measured quantity for the appearance of ghost images in the FLC displays with the test cells used:

Bipolar pulses of the same polarity sequence and an overall width of 200 µs and a height of 4 V/µm are used. The pulse interval is 20 ms. The polarity sequence changes every 5 seconds. FIG. 3 shows the switching behavior on use of bipolar pulses of the same polarity sequence, which changes after 5 seconds. Even for this pulse addressing, the advantage of the FLC mixture according to the invention can be seen from the very rapid switching from bright to dark and vice-versa without the annoying appearance of so-called smearing effects. Here too the optical transmission at a temperature of 25° C. of a test cell filled with the FLC mixture is plotted against time. a) FLC mixture M2, b) FLC mixture M2 containing 1 mol-% of cryptand K8.

Example 4

FLC mixture M3 has the following composition (in mol-%):

| LC mixture C | 91.7 |
|---|---|
| Dope D4 | 7.0 |
| Dope D5 | 1.3 | and the phase sequence $S_c^*$ 69 $S_A^*$ 75 N* 82 I. It has a spontaneous polarization of -9.6 nC·cm$^-$.

In this example too, the test scheme described above for characterizing ghost images clearly showed the advantages of the use according to the invention of complex ligands for ions, shown in FIG. 4 in analogous manner to that in FIG. 3.

The optical transmission of a test cell filled with FLC mixture M3 at a temperature of 25° C. is plotted against time. Bipolar pulses of the same polarity sequence and an overall width of 200 µs and a height of 12 V/µm are used. The pulse interval is 20 ms. The polarity sequence changes every 5 seconds. a) FLC mixture M3, b) FLC mixture M3 containing 1 mol-% of complex ligand K8. Here too, the switching from dark to bright takes place instantly and without smearing effects, in contrast to FLC mixture M3 containing no complex ligands.

Example 5

FLC mixture M4 has the following composition (in mol-%):

| LC mixture C | 87.67% |
|---|---|
| Dope D1 | 4.53% |
| Dope D2 | 2.70% |
| Dope D3 | 5.10% | and the phase sequence $S_c^*$ 61 $S_A^*$ 69 N* 85 I and a spontaneous polarization of 30 nC·cm$^{-2}$.

The cryptands or coronands K8 (0.5 mol-%) and K5 (1.5 mol-%) are added to FLC mixture M4 to give mixture M4'. The test cells used (our own cell construction) are coated both with a conventional polyimide and with a partially fluorinated polyimide as the alignment material.

The mixtures according to the invention are assessed using the effective switching angle, the transmissions in the bright and dark states and the optical contrast.

Table 3 shows a comparison between FLC mixture M4 with the modified FLC mixture (M4'). The effective tilt angle and the associated transmission in the bright state increase considerably. However, the transmission in the dark state also drops significantly, causing an overall drastic increase in the optical contrast. If FLC cells are treated with alternating electrical fields of certain field strength and frequency (for example 10 Hz, 15 V/µm), a change in the smectic layer structure can be achieved (bookshelf geometry, see Dübal et al. in "Proceedings of the 6th International Symposium on Elektrets", Oxford, England 1988 Eds. D. K. Das-Gypta and A. W. Pattullo), which are distinguished by a switching angle close to 45°. Using this texture, a transmission in the bright state of virtually 100% can thus be achieved. The results for the FLC mixture M4 with and without coronands or cryptands are shown in Table 4. Here too, a considerable improvement in the dark state and thus in the optical contrast are apparent.

FLC mixture M4 and the modified FLC mixture M4' are introduced into two identical, commercially available FLC cells provided with electrodes (from E.H.C.) with alignment layers on both sides comprising $SiO_x$ (vapor-deposition at an angle of 83°).

The cells are subjected at room temperature to alternating bipolar electrical pulses with an overall duration of 1 ms. From a certain critical pulse amplitude (field strength), the cell filled with the mixture according to the invention switches to and fro between the known bistable and uniform switching states. In the case of the comparison cell (only M4), by contrast, two twist states occur at these amplitudes, which hardly differ in their optical transmission capacity and therefore do not give good contrast.

Only at very much higher amplitudes does the comparison cell (FLC mixture M4 without additives) also switch with high contrast between two uniform states; even here, however, the contrast does not reach the value for the mixture according to the invention. The comparison is shown diagrammatically in FIG. 5. The contrast (CR) is plotted against the field strength E (in V/m). Curve (a) corresponds to the FLC mixture according to the invention, and curve (b) to the FLC mixture M4 without addition of cryptands or coronands.

bright can be employed as a characteristic quantity for assessing a complex ligand. Table 5 shows the relative effectiveness of complex ligands K5, K8 and K12 in test mixture M4, setting the action of K8 (time constant of switching) at one.

TABLE 5

| FLC mixture | Effectiveness |
|---|---|
| 6A | 0.18 |
| 6B | 1.00 |
| 6C | 0.60 |

The table clearly shows that the cryptands are particularly suitable for avoiding optical hysteresis.

Example 7

(guest-host cell) (dye cell)

A ferroelectric mixture M5 according to the invention comprises the following 14 components (in % by weight):

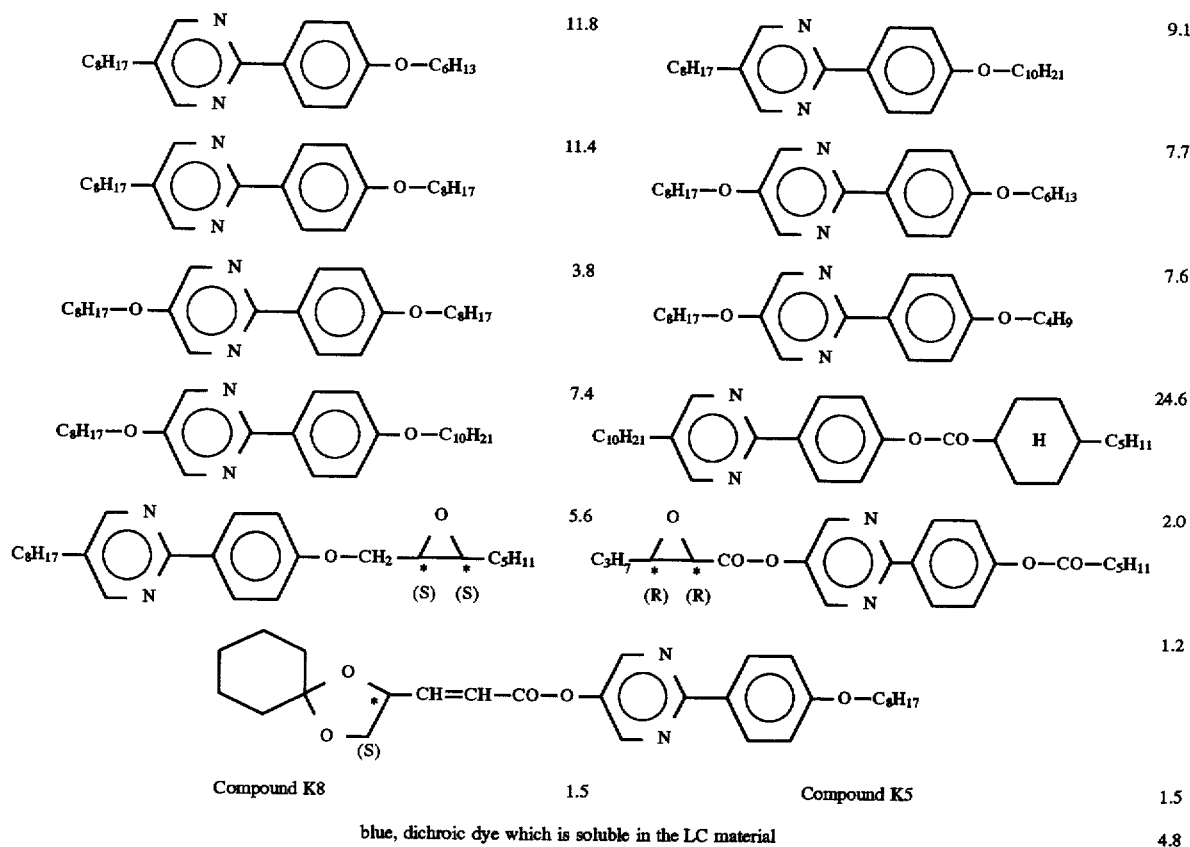

Example 6

In separate experiments, 1 mol-% of each of the complex ligands K5 (FLC mixture 6A), K8 (FLC mixture 6B) and K12 (FLC mixture 6C) are added to FLC mixture M4. The ghost image behavior is characterized using the test scheme described in Example 3. The switching from bright to dark (in chevron geometry) should take place very quickly and without smearing effects. The time constant with which the bright storage state is produced on switching from dark to and has the following phases (in °C.):

X −4.5 $S_c$* 66.3 $S_A$* 69.6 N* 94 I

This mixture is introduced into a cell (internal plate separation 3.4 μm) with polyimide alignment layers rubbed parallel and subjected for about 3 minutes to field treatment with rectangular pulses of a frequency of 10 Hz and a field strength of ±10 V/μm$^{-1}$:

Under a transmitted light microscope, a polarizing foil is oriented at an angle to the temperature-controlled cell so that light transmission is at a minimum (polarizer and preferential alignment of the molecules are crossed. After a switching pulse (8 V/μm$^{-1}$; 500 μs), the molecules adopt a position rotated by 47° relative to this position, and the light is absorbed less strongly.

In order to match the illumination to the dye, a filter is used during the contrast measurement (manufacturer: Schott, 75760/632 nm). The contrast, i.e. the ratio between the transmissions in the bright state and dark state is measured using a photodiode and is 24:1 for this cell.

As a comparative example, a polyimide-coated cell (internal plate separation of 3.0 μm) was filled with a mixture which differed from the mixture according to the invention only in that it contained no coronands or cryptands.

The contrast of this mixture, determined as described above, is 11:1. The use of complexing agents accordingly results in a significant improvement in contrast.

This example confirms that coronands and cryptands result in a significant improvement in LC mixtures containing dyes for use in guest-host displays.

Table 6. Compared with conventional polyimide, SiO$_2$ alignment layers and the FLC mixtures according to the invention give considerably better contrast. A further advantage is the better insulation capacity of SiO$_2$ layers, since electrical shortcircuits are a problem which must be taken seriously.

TABLE 1

Comparison of the effective switching angle for LC base mixture A and mixture (A + coronand) according to the invention

|  | LC mixture A | LC mixture A + 2 mol-% of K5 |
|---|---|---|
| 2 θ$_{eff}$ [°C.] | 20 | 28 |

TABLE 2

FLC mixture M1 containing in each case 1 mol-% of coronand or cryptand

| Complex ligand | without | K1 | K2 | K3 | K4 | K5 | K6 | K7 | K9 | K10 | K11 |
|---|---|---|---|---|---|---|---|---|---|---|---|
| 2 θ$_{eff}$ [°] | 15 | 24 | 22 | 22 | 20 | 22 | 20 | 22 | 24 | 23 | 20 |
| Transmission dark (%) | 8.0 | 1.9 | 1.1 | 2.0 | 3.6 | 0.7 | 2.5 | 1.0 | 0.2 | 1.5 | 0.6 |
| Transmission bright (%) | 28 | 55 | 51 | 50 | 43 | 49 | 43 | 48 | 58 | 53 | 42 |
| Contrast | 3.5 | 29 | 46 | 25 | 12 | 70 | 17 | 48 | 290 | 35 | 70 |

Example 8

To demonstrate the advantageous properties of the FLC mixture according to the invention together with SiO alignment layers, we have produced our own test cells. To this end, glass plates coated with a 4×4 mm$^2$ electrode area comprising indium-tin oxide (ITO) were cleaned using an aqueous surfactant solution and subsequently with alcohol and then coated with a dilute organosilicon compound. The application was effected using a spin coater, but other methods, for example printing or dipping, can also be used. The layer, approximately 20 nm thick, was conditioned at a temperature of about 250° C. and subsequently rubbed with a velour-like material. The glass plates obtained in this way were stuck together to form test cells. The starting compounds for the alignment layers were an SiO$_2$-containing material such as, for example, ®Liquicoat (manufacturer: Merck, Darmstadt) and ®Silan-TPN (manufacturer: Wacker Chemie, München). The test cells produced by us were compared with conventional test cells (manufacturer: E.H.C. Inc., Tokyo) having a polyimide alignment layer. This was done using PLC test mixture M4 to which 1.5 mol-% K8 had been added. The mixtures according to the invention in combination with an SiO$_2$ alignment layer were assessed using the transmissions in the bright and dark states, the optical contrast, the switching angle 2 θ$_{eff}$ and the maximum possible bias (ratio between line and data voltage). The results for chevron and bookshelf geometries are shown in

TABLE 3

FLC mixture M4 with/without coronand or cryptand in the chevron geometry (FLC mixture M4' differs from M4 through the addition of 0.5% of K8 and 1.5% of K5)

|  | Test cells using polyimide as the alignment layer | | Test cells using fluorinated polyimide as the alignment layer | |
|---|---|---|---|---|
|  | M4 | M4' | M4 | M4' |
| 2 θ$_{eff}$ [°] | 14 | 23 | 14 | 28 |
| Transmission dark (%) | 1.9 | 0.21 | 4.9 | 0.4 |
| Transmission bright (%) | 26 | 44 | 27 | 68 |
| Contrast | 13 | 210 | 5.5 | 170 |

TABLE 4

FLC mixture with/without cryptand or coronand in the bookshelf geometry (FLC mixture M4' differs from M4 through the addition of 0.5% of K8 and 1.5% of K5). The test cells were treated with a rectangular field (10 Hz, 30 V) before the measurement

| | Test cells using polyimide as the alignment layer | | Test cells using fluorinated polyimide as the alignment layer | |
|---|---|---|---|---|
| | M4 | M4' | M4 | M4' |
| 2 θ$_{eff}$ [°] | 50 | 50 | 50 | 50 |
| Transmission dark (%) | 2.1 | 0.9 | 7.1 | 0.3 |
| Transmission bright (%) | 88 | 97 | 88 | 98 |
| Contrast | 42 | 108 | 12 | 327 |

TABLE 6

| | Test cell having an alignment layer of | | |
|---|---|---|---|
| | Polyimide | ®Liquicoat | Silan-TPN |
| Chevron geometry: | | | |
| Transmission bright (%) | 24 | 25 | 25 |
| Transmission dark (%) | 0.6 | 0.4 | 0.5 |
| Contrast maximum bias | 40 | 62.5 | 50 |
| | — | — | — |
| 2 θ$_{eff}$ | 20° | 23° | 24° |
| Bookshelf geometry: | | | |
| Transmission bright (%) | 92 | 94 | 96 |
| Transmission dark (%) | 2.5 | 0.8 | 0.6 |
| Contrast maximum bias | 37 | 117 | 160 |
| | 4 | 3.5 | 5 |
| 2 θ$_{eff}$ | 53° | 52° | 52° |

Re. FIG. 5

(a) The contrast (CR) of an E.H.C. cell with SiO$_x$ vapor-deposited at an angle as the alignment layer and filled with mixture M4' according to the invention is shown as a function of the amplitude (field strength E) of the bipolar switching pulses used for switching.

(b) The contrast (CR) of a cell filled with comparative mixture M4 is shown under the same conditions as (a).

We claim:

1. A ferroelectric liquid-crystal mixture comprising at least two components, wherein one component is at least one electrically neutral complex ligand for cations comprising at least two donor atoms which are nitrogen, nitrogen and oxygen, nitrogen and sulfur, sulfur or sulfur and oxygen.

2. An FLC mixture as claimed in claim 1, wherein the complex ligands are mediocyclic or macrocyclic compounds.

3. An FLC mixture as claimed in claim 1, wherein the complex ligands are cryptands.

4. An FLC mixture as claimed in claim 1, wherein the complex ligands are coronands.

5. An FLC mixture as claimed in claim 1, wherein the complex ligands are podands.

6. An FLC mixture as claimed in claim 1, wherein the complex ligands are bicyclic compounds which contain at least two nitrogen atoms.

7. An FLC mixture as claimed in claim 1, wherein the complex ligands are bicyclic or tricyclic compounds.

8. An FLC mixture as claimed in claim 1, wherein the complex ligands are bicyclic or tricyclic compounds which contain at least two nitrogen atoms and at least four oxygen atoms.

9. An FLC mixture as claimed in claim 1, containing at least two different complex ligands for ions.

10. An FLC mixture as claimed in claim 1, containing at least one complex ligand for alkali metal and/or alkaline earth metal ions.

11. An FLC mixture as claimed in claim 1, containing at least two different complex ligands for different cations.

12. An FLC mixture as claimed in claim 1, wherein the complex ligand is a compound of the general formula (I),

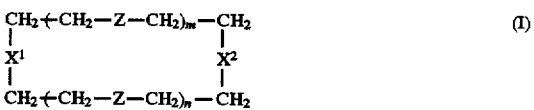

in which

—Z— is —O— or —S—, m and n are integers greater than zero, where m+n=2 to 6, —X$^1$— and —X$^2$— are identical or different and are

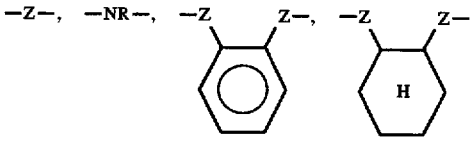

or

—X$^1$— and —X$^2$— together are

N—CH$_2$(—CH$_2$—Z—CH$_2$)$_l$—CH$_2$—N or
N—CO(—CH$_2$—Z—CH$_2$)$_l$—CO—N or
H—C—CH$_2$(—CH$_2$—Z—CH$_2$)$_2$—CH$_2$—C—H, where R is alkyl or alkoxy having from 1 to 15 carbon atoms, phenyl, benzyl or benzoyl and l is 1 or 2.

13. An FLC mixture as claimed in claim 1, wherein the complex ligand is a compound of the general formula

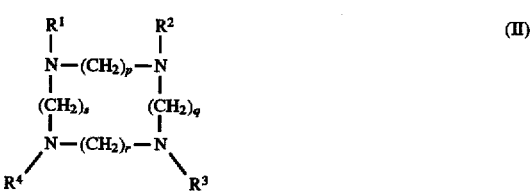

where R$^1$, R$^2$, R$^3$ and R$^4$, independently of one another, are —H, —(C$_1$-C$_{12}$)alkyl,

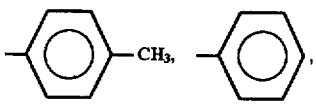

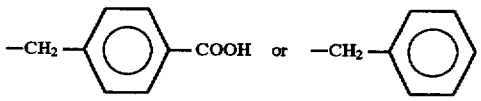

and p, q, r and s, independently of one another, are an integer from 2 to 4, and where p+q+r+s=8 to 16.

14. An FLC mixture as claimed in claim 1, containing from 0.01 to 10 mol-% of at least one complex ligand.

15. An FLC mixture as claimed in claim 1, which has a spontaneous polarization of at least 35 nC·cm$^{-2}$.

16. A liquid-crystal switching or display device containing a ferroelectric liquid-crystalline medium, outer plates, electrodes, at least one alignment layer and optionally, additional auxiliary layers, wherein the ferroelectric liquid-crystalline medium is an FLC mixture as claimed in claim 1.

17. A liquid-crystal switching or display device as claimed in claim 16, which is an SSFLC cell having an FLC layer thickness of from 1 to 20 μm and wherein the FLC mixture contains, as complex ligand, at least one mediocyclic or macrocyclic compound.

18. A liquid-crystal switching or display device as claimed in claim 16, which is an SSFLC cell having an FLC layer thickness of from 1 to 10 μm and wherein the FLC mixture contains, as complex ligand, at least one cryptand and/or coronand.

19. A liquid-crystal switching or display device as claimed in claim 16, wherein the alignment layer comprises an SiO$_2$-containing material.

20. A ferroelectric liquid-crystal mixture comprising at least two compounds, wherein one component is at least one complex ligand of the formula (I),

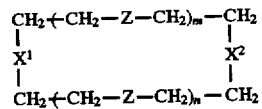
(I)

in which

—Z— is —O— or —S—, m and n are integers greater than zero, where m+n equals 2 to 6, —X$^1$— and —X$^2$— are identical or different and are

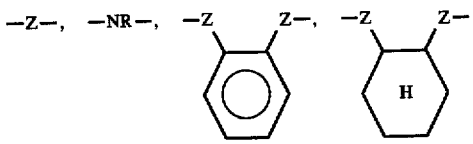

or

—X$^1$— and —X$^2$— together are

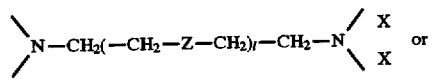
or

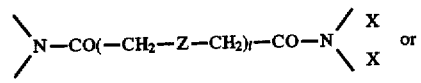
or

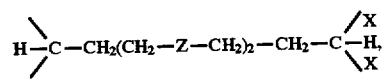

where

R is alkyl or alkoxy having from 1 to 15 carbon atoms, phenyl, benzyl or benzoyl and l is 1 or 2, with the proviso that X$^1$, X$^2$ and Z are not all simultaneously oxygen or all simultaneously sulfur.

* * * * *